(12) United States Patent
Oh et al.

(10) Patent No.: US 11,169,608 B2
(45) Date of Patent: Nov. 9, 2021

(54) DISPLAY DEVICE

(71) Applicant: Samsung Display Co., Ltd., Yongin-si (KR)

(72) Inventors: Joon Hak Oh, Seongnam-si (KR); Jae Been Lee, Seoul (KR); Byeong Hee Won, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/915,891

(22) Filed: Jun. 29, 2020

(65) Prior Publication Data

US 2021/0041954 A1 Feb. 11, 2021

(30) Foreign Application Priority Data

Aug. 9, 2019 (KR) .......................... 10-2019-0097421

(51) Int. Cl.
*G06F 3/043* (2006.01)
*G06F 3/01* (2006.01)
*H02N 2/00* (2006.01)

(52) U.S. Cl.
CPC .............. *G06F 3/016* (2013.01); *H02N 2/008* (2013.01); *G06F 2203/014* (2013.01)

(58) Field of Classification Search
None
See application file for complete search history.

(56) References Cited

U.S. PATENT DOCUMENTS

| 8,818,006 B2 | 8/2014 | Yamauchi et al. |
| 9,134,795 B2 | 9/2015 | Braun et al. |
| 10,009,683 B2 | 6/2018 | Choi et al. |
| 2013/0113760 A1* | 5/2013 | Gossweiler, III ..... G06F 3/0433 345/177 |
| 2014/0184545 A1* | 7/2014 | Tanaka ............... G03G 15/5016 345/173 |
| 2018/0107378 A1* | 4/2018 | Rosenberg .............. G06F 3/016 |

FOREIGN PATENT DOCUMENTS

| JP | 5192799 | 5/2013 |
| KR | 10-1684141 | 12/2016 |
| KR | 10-1890761 | 8/2018 |

* cited by examiner

*Primary Examiner* — Carl Adams
(74) *Attorney, Agent, or Firm* — H.C. Park & Associates, PLC

(57) ABSTRACT

A display device includes a display panel, a main vibrator disposed on the display panel configured to generate a main vibration wave, and a plurality of sub-vibrators disposed on the display panel and spaced apart from the main vibrator and configured to the plurality of sub-vibrators configured to generate sub-vibration waves, respectively, wherein the plurality of sub-vibrators includes a first sub-vibrator disposed at a first distance from the main vibrator in a plan view, the first sub-vibrator being configured to generate a first sub-vibration wave; and a second sub-vibrator disposed at a second distance from the main vibrator in the plan view, the second sub-vibrator being configured to generate a second sub-vibration wave having a phase different from the first sub-vibration wave, and, wherein the second distance is different from the first distance.

20 Claims, 14 Drawing Sheets

FIG. 23

| STATUS | FREQUENCY (Hz) | AMPLITUDE | PERIOD (ms) | NUMBER OF AMPLITUDE INCREASES | NUMBER OF AMPLITUDE DECREASES |
|---|---|---|---|---|---|
| COUNT BEFORE START | 46 | 52 | 298 | 4 | 4 |
| START | 62 | 66 | 736 | 0 | 0 |
| TOUCH FIRST ACCELERATION ICON | 203 | 60 | 98 | 3 | 0 |
| TOUCH SECOND ACCELERATION ICON | 203 | 60 | 201 | 5 | 0 |
| COLLISION | 148 | 50 | 47 | 1 | 1 |
| DRIFT | 46 | 52 | 725 | 1 | 1 |
| STOP | 15 | 59 | 2500 | 0 | 0 |

DISPLAY DEVICE

CROSS-REFERENCE TO RELATED APPLICATION

This application claims priority from and the benefit of Korean Patent Application No. 10-2019-0097421, filed on Aug. 9, 2019, which is hereby incorporated by reference for all purposes as if fully set forth herein.

BACKGROUND

Field

Exemplary embodiments of the invention relate generally to a display device, more particularly, a display device with precise vibration control.

Discussion of the Background

Electronic apparatuses providing images to users, such as a smartphone, a tablet PC, a digital camera, a laptop computer, a vehicle navigation device, and smart television, include display devices for displaying images. The display device includes a display panel for generating and displaying an image and various input devices.

The display device has been developed in order to provide various physical user interfaces (UIs) such as visual, auditory, and tactile interfaces to users as feedback in response to touch. Among them, haptic feedback, which is a tactile feedback method, is a method of outputting a physical force to a user based on events or interactions occurring in various graphic environments. When a touch is detected by the display device, vibration is applied to the user to convey a haptic feeling.

Display devices may include vibrator to provide haptic feedback. However, it is difficult to provide precise haptic feedback when the vibration of the vibrator is insufficient or when a vibration occurs in areas other than the touch area.

The above information disclosed in this Background section is only for understanding of the background of the inventive concepts, and, therefore, it may contain information that does not constitute prior art.

SUMMARY

Devices constructed according to exemplary embodiments of the invention provide a display device capable of performing precise vibration control.

Additional features of the inventive concepts will be set forth in the description which follows, and in part will be apparent from the description, or may be learned by practice of the inventive concepts.

According to one or more embodiments of the invention, a display device includes a display panel, a main vibrator disposed on the display panel configured to generate a main vibration wave, and a plurality of sub-vibrators disposed on the display panel and spaced apart from the main vibrator and configured to the plurality of sub-vibrators configured to generate sub-vibration waves, respectively, wherein the plurality of sub-vibrators includes a first sub-vibrator disposed at a first distance from the main vibrator in a plan view, the first sub-vibrator being configured to generate a first sub-vibration wave; and a second sub-vibrator disposed at a second distance from the main vibrator in the plan view, the second sub-vibrator being configured to generate a second sub-vibration wave having a phase different from the first sub-vibration wave, and, wherein the second distance is different from the first distance.

A phase of the main vibration wave may be different from the phase of the first sub-vibration wave and the phase of the second sub-vibration wave.

The main vibration wave, the first sub-vibration wave and the second sub-vibration wave may have the same wavelength.

A difference ($\Delta\theta_1$) between the phase of the first sub-vibration wave and the phase of the main vibration wave may satisfy the following equation 1: $\Delta\theta_1 = 180°*n - (360°*d1)/\lambda$, a difference ($\Delta\theta_2$) between the phase of the second sub-vibration wave and the phase of the main vibration wave may satisfy the following equation 2: $\Delta\theta_2 = 180°*n - (360°*d2)/\lambda$, wherein n is an integer, d1 is a distance between the main vibrator and the first sub-vibrator, d2 is a distance between the main vibrator and the second sub-vibrator, and $\lambda$ is a wavelength of the main vibration wave, the first sub-vibration wave and the second sub-vibration wave.

Each of the first distance and the second distance may be smaller than half of the wavelength.

A difference between the phase of the first sub-vibration wave and the phase of the main vibration wave may be greater than 0° and less than 180°, and a difference between the phase of the second sub-vibration wave and the phase of the main vibration wave may be greater than 0° and less than 180°.

The first sub-vibration wave and the second sub-vibration wave may be configured to destructively interfere with the main vibration wave.

The display device may further include a phase controller configured to control a phase of an AC voltage provided to the main vibrator and each of the first and second sub-vibrators.

A maximum amplitude of the first main vibrator may be greater than a maximum amplitude of the first sub-vibrator or the second sub-vibrator.

The plurality of sub-vibrators at least may partially surround the main vibrator.

The main vibrator may be disposed in a central region of the display panel in the plan view, and the plurality of sub-vibrators may be disposed along edges of the display panel in the plan view.

The display device may further include a cover panel overlapping the display panel, the display panel may include a display surface and an opposite surface facing opposite to the display surface, the cover panel may be disposed on the opposite surface of the display panel, and the main vibrator and the sub-vibrators may be attached on the cover panel.

The display device may further include a touch member disposed on the display surface of the display panel.

Each of the main vibrator and the sub-vibrators may include at least one of a piezoelectric element and an exciter.

The main vibrator may include a first main vibrator and a second main vibrator spaced apart from each other in the plan view.

The plurality of sub-vibrators may surround the first main vibrator and the second main vibrator in the plan view.

The sub-vibrators may be not disposed between the first main vibrator and the second main vibrator in the plan view.

The first main vibrator may be configured to generate a first main vibration wave during a first driving mode, and the second main vibrator may be configured to generate a vibration wave to cancel out the first main vibration wave during the first driving mode.

The first main vibrator may be configured to generate the first main vibration wave during in a second driving mode, and the second main vibrator may be configured to generate a second main vibration wave which constructively interferes with the first main vibration wave during in the second driving mode.

According to one or more embodiments of the invention, a display device includes a display panel, a first vibrator disposed on the display panel, and a second vibrator disposed on the display panel and spaced apart from the first vibrator, a difference ($\Delta\theta$) between a phase of a vibration wave of the second vibrator and a phase of a vibration wave of the first vibrator satisfies the following equation: $\Delta\theta=180°*n-(360°*d)/\lambda$, n is an integer, d is a distance between the first vibrator and the second vibrator, and $\lambda$ is a wavelength of the vibration wave of the first vibrator and the vibration wave of the second vibrator.

According to a display device according to an exemplary embodiment, a vibration wave generated by each vibrator is effectively interfered according to a separation distance of a plurality of vibrators, thereby enabling precise vibration control. Thus, it is possible to perform a precise haptic operation or sound control by using a plurality of vibrators.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a perspective view of an exciter according to another exemplary embodiment.

FIG. 23 is a table illustrating a haptic interface providing method of a display device according to an exemplary embodiment.

DETAILED DESCRIPTION OF THE EMBODIMENTS

Figure 1:
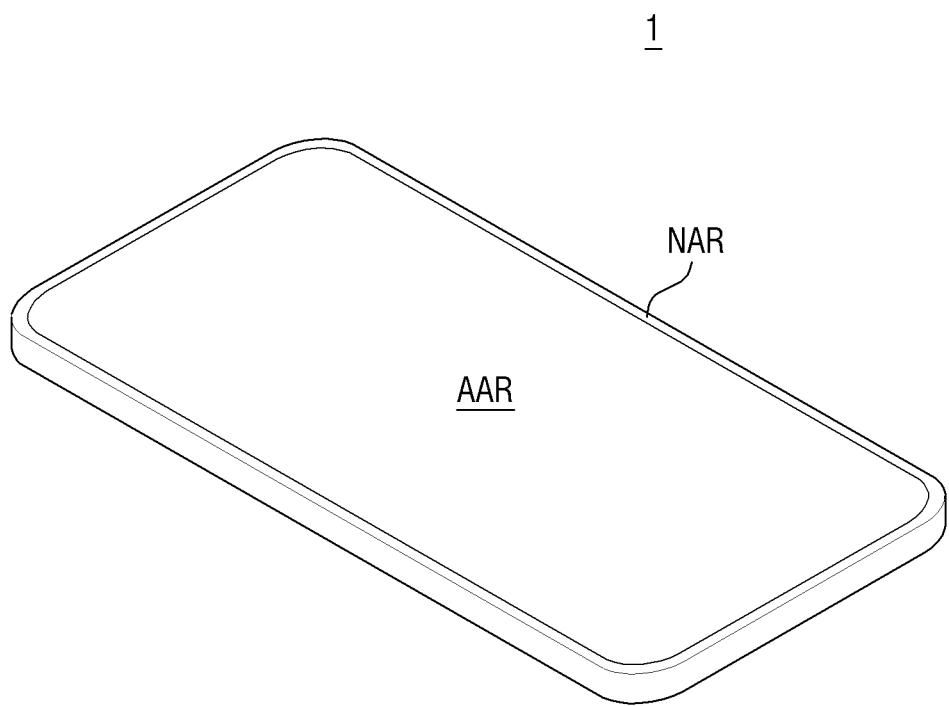
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of a display device according to an exemplary embodiment.

Referring to FIG. 1, a display device 1 displays a moving image or a still image. Examples of the display device 1 may include a mobile phone, a smartphone, a tablet personal computer (PC), an electronic watch, a smart watch, a watch phone, a mobile communication terminal, an electronic notebook, an electronic book, a portable multimedia player (PMP), a vehicle navigation device, a game machine, a digital camera, a television, a laptop computer, a monitor, a billboard, an Internet-of-Things device, and the like, which provide a display screen.

The display device 1 includes an active region AAR and a non-active region NAR. The active region AAR is a region where the main function of the display device 1 is implemented, and may include a display area for displaying a screen. The active region AAR may further include a touch area for sensing a touch input. The display area may include a plurality of pixels, and the touch area may include a plurality of touch sensing cells. The display area and the touch area may overlap each other in a thickness direction. The active region AAR may have a rectangular shape, a square shape, other polygonal shapes, a circular shape, an elliptical shape or the like, but the exemplary embodiments of the present disclosure are not limited thereto. The active area AAR may also include two or more planes. For example, the display device 1 may be bent, folded or bent such that the active area AAR is disposed on a plurality of planes.

The non-active region NAR may be disposed around the active region AAR. The non-active region NAR may be a bezel area. The screen may not be displayed in the non-active region NAR. That is, the non-active region NAR may include a non-display area of the display device 1. The non-active region NAR may not include the touch area (non-touch area), but the exemplary embodiments of the present disclosure are not limited thereto. A touch cell or a pressure sensor may be disposed on at least a portion of the non-active region NAR to detect an input signal according to touch or pressurization. In the non-active region NAR, signal wires or driving circuits for applying a signal to the active area AAR (display area or touch area) may be disposed.

The non-active region NAR may be disposed to surround the active region AAR. When the active region AAR has a rectangular shape, the non-active region NAR may have a rectangular frame shape surrounding the rectangle. When the active region AAR has a circular shape, the non-active region NAR may have a donut shape surrounding the circle. However, the exemplary embodiments of the present disclosure are not limited thereto. As in a bezel-less display device 1, the entire surface of the display device 1 may be formed only of the active region AAR in the thickness direction such that the non-active region NAR does not exist. Alternatively, the non-active region NAR may be disposed on only a portion of sides of the active region AAR, and the active region AAR itself may form an edge of the display device 1 on the other portion of the sides without the non-active region NAR.

Figure 2:
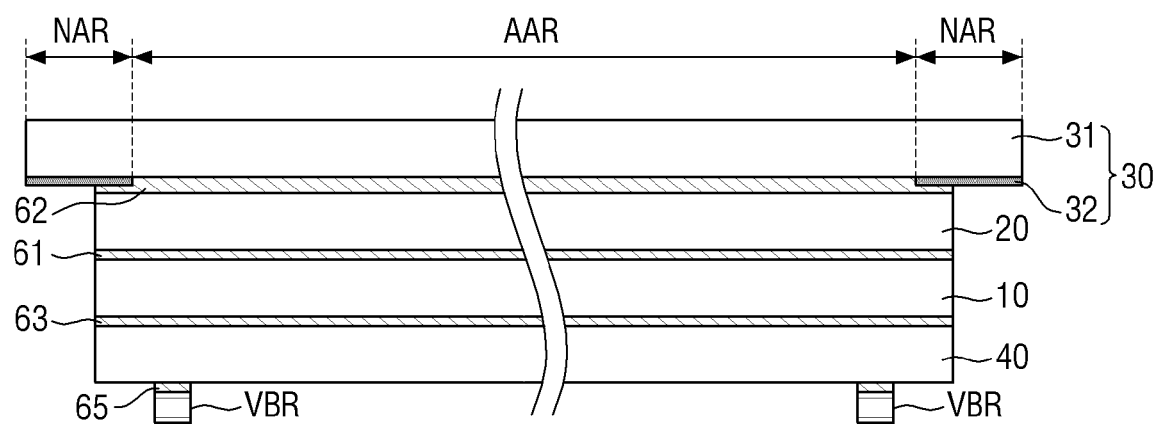
FIG. 2 is a cross-sectional view of the display device of FIG. 1.

FIG. 2 is a cross-sectional view of the display device of FIG. 1. Referring to FIG. 2, the display device 1 may include a display panel 10, a touch member 20 disposed on one surface of the display panel 10 (upper side in the drawing), and a vibration member VBR disposed on the other surface of the display panel 10 (lower side in the drawing).

The display panel 10 serves to provide a display screen. The display panel 10 includes a plurality of pixels which are basic units of a screen. Examples of the display panel 10 may include an organic light emitting display panel, a micro LED display panel, a nano LED display panel, a quantum dot light emitting display panel, a plasma display panel, a field emission display panel, an electrowetting display panel, a liquid crystal display panel, an electrophoretic display panel, and the like.

When the display panel 10 is a light emitting panel such as an organic light emitting display panel, the display panel 10 may include a first electrode (e.g., an anode), a second electrode (e.g., a cathode), and a light emitting layer interposed between the first electrode and the second electrode. When the light emitting panel is of an active type, the display panel 10 may include a driving circuit such as a thin film transistor or the like for driving each pixel. The first electrode may be a pixel electrode provided for each pixel, and the second electrode may be a common electrode disposed over a plurality of pixels. The light emitting layer may be an organic light emitting layer, a micro LED, a nano LED, a quantum dot layer, a fluorescent layer, or the like.

When the display panel 10 is a light receiving panel such as the liquid crystal display panel 10, the display device 1 further includes a light providing member such as a backlight unit. The display panel 10 may include a first electrode and a second electrode for generating an electric field, and a light transmittance control member. The behavior of the light transmittance control member can be controlled by the electric field generated by the first electrode and the second electrode. When the light receiving panel is of an active type, the display panel 10 may include a driving circuit such as a thin film transistor for driving each pixel. The first electrode may be a pixel electrode provided for each pixel, and the second electrode may be a common electrode disposed over a plurality of pixels. The light transmittance control member may be a liquid crystal layer, light-shielding electrophoretic particles, or the like.

The display panel 10 may be rigid or flexible. The rigid display panel 10 may use a rigid substrate such as a glass substrate as a base substrate. The flexible display panel 10 may be bent, folded, or rolled. In the case of the flexible display panel 10, flexible plastic such as polyimide or ultra-thin glass that can be bent may be used as a material of the base substrate.

The touch member 20 may be disposed on one surface of the display panel 10. One surface of the display panel 10 may be a surface (or a display surface) located in a display direction. The touch member 20 includes a plurality of touch cells. Each touch cell may be defined by one or more touch electrodes. The size of the touch cell of the touch member 20 may be larger than that of the pixel. The touch cell may have, for example, a rhombus or square shape having one side of about 4 mm, but the exemplary embodiments of the present disclosure are not limited thereto. The touch member 20 may recognize whether a touch gesture occurs by a self-capacitance method or a mutual capacitance method, but the exemplary embodiments of the present disclosure are not limited thereto.

The touch member 20 may be provided in the form of a panel or film. The touch member 20 may be attached to one surface of the display panel 10 through a first transparent bonding layer 61 such as an optically clear adhesive (OCA) or an optically clear resin (OCR). In another embodiment, the touch member 20 may be disposed integrally inside the display panel 10. For example, a touch electrode may be formed on the electrode constituting the light emitting element of the display panel 10 to function as the touch member 20. Alternatively, at least one (e.g., a second electrode which is a cathode electrode of the organic light emitting display panel) of the electrodes constituting the light emitting element may be used together as a touch electrode to function as the touch member 20.

A window member 30 may be further disposed on the touch member 20. The window member 30 may cover and protect the display panel 10. The window member 30 may be attached to one surface of the touch member 20 through a second transparent bonding layer 62 such as an optically clear adhesive (OCA) or an optically clear resin (OCR). The window member 30 may be larger than the display panel 10, and an edge of the window member 30 may protrude from an edge of the display panel 10.

The window member 30 may include a window substrate 31 and a printed layer 32.

The window substrate 31 may be made of a transparent material. The window substrate 31 may be formed to include, for example, glass or plastic. When the window substrate 31 includes plastic, the window substrate 31 may have a flexible property.

The printed layer 32 may be disposed on the window substrate 31. The printed layer 32 may be disposed on one surface and/or the other surface of the window substrate 31. The printed layer 32 may be disposed on an edge portion of the window substrate 31 and may be disposed on the non-active region NAR. The printed layer 32 may be a decorative layer and/or an outermost black matrix layer that imparts an aesthetic appeal.

The vibration member VBR may be disposed on the other surface of the display panel 10. The other surface of the display panel 10 may be an opposite surface of one surface of the display panel 10 serving as the display surface. The vibration member may be disposed in contact with the other surface (back surface) of the display panel 10. Here, the fact that the vibration member is disposed on the other surface of the display panel 10 includes not only a case where the vibration member is disposed directly on the other surface of the display panel 10 but also a case where the vibration member is disposed on the other surface of the display panel 10 with another layer or panels interposed therebetween. In addition, it may be construed that the fact that the vibration member is in contact with the other surface of the display panel 10 includes not only a case where the vibration member is in direct contact with the other surface of the display panel 10 but also a case where the vibration member is in contact with the other surface of the display panel 10 through other members such as a bonding layer.

In one exemplary embodiment, the display device 1 may further include a cover panel 40 disposed on the other surface of the display panel 10. The cover panel 40 may be attached to the other surface of the display panel 10 through a bonding layer 63, including an adhesive or the like, between panels. When the display device 1 includes the cover panel 40, the vibration member may be disposed on or attached to the other surface of the cover panel 40. Hereinafter, a case where the vibration member is attached to the cover panel 40 disposed to overlap on the other surface of the display panel 10 will be described as an example, but the exemplary embodiments of the present disclosure are not limited thereto. Without the cover panel 40, the vibration member is directly attached on the other surface of the display panel 10. Alternatively, the vibration member may be disposed in the periphery of the cover panel 40 or in an area exposed by a hole, and may be directly attached to the other surface of the display panel 10. Furthermore, the vibration member may be disposed between the display panel 10 and the cover panel 40 or inside the cover panel 40.

The cover panel 40 may include at least one functional layer. The functional layer may be a layer that performs a heat dissipation function, an electromagnetic shielding function, a grounding function, a buffering function, a rigidity enhancing function, a supporting function, an adhesive function, a pressure sensing function, a digitizing function and/or the like. The functional layer may be a sheet layer, a film layer, a thin film layer, a coating layer, a panel, a plate, or the like. One functional layer may consist of a single layer or a stack of multiple thin films or coating layers. The functional layer may be, for example, a supporting substrate, a heat dissipation layer, an electromagnetic shielding layer, an impact absorbing layer, a bonding layer, a pressure sensor, a digitizer, or the like.

The vibration member may include a plurality of vibrators VBR spaced apart from each other. Each vibrator VBR may be disposed to be attached to or in contact with the other surface of the display panel 10 or the cover panel 40 individually, but may be disposed in contact with (or to be attached to) the other surface of the display panel 10 or the cover panel 40 in an arrayed state on a member having a predetermined area, such as a plate, a film, a sheet, or the like.

The vibration member may be operated by a driving signal. The vibration member may generate vibration and provide vibration waves to the display panel 10. The vibration waves may propagate in the thickness direction and/or planar direction through the display panel 10. The vibration generated by the vibration member may provide haptic or sound to the display device 1.

Figure 3:
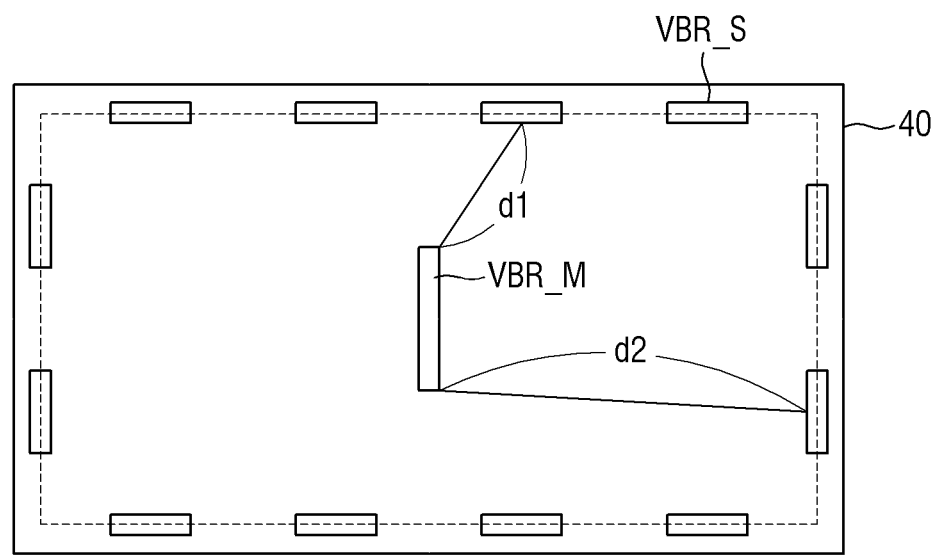
FIG. 3 is a layout diagram of a cover panel and vibrators according to an exemplary embodiment.

FIG. 3 is a layout diagram of a cover panel and vibrators according to an exemplary embodiment.

As shown in FIG. 3, a plurality of vibrators VBR may be disposed on the other surface of the cover panel 40. The vibrators VBR may be spaced apart from each other. Each vibrator VBR may perform a vibration operation and generate vibration waves. The vibration waves generated by the vibrators VBR may be amplified or cancelled out while cooperating (overlapping) with each other. The interaction of the waves may be used to amplify or attenuate the vibration to perform a precise haptic operation or to generate sound.

The plurality of vibrators VBR may include a piezoelectric element or an exciter. The exciter may include a voice coil. The exciter may be a linear resonant actuator (LRA) that vibrates the cover panel 40 and the display panel 10 in a vertical direction by generating a magnetic force using the voice coil, but the exemplary embodiments of the present disclosure are not limited thereto. Hereinafter, the piezoelectric element and the exciter will be described in detail.

Figure 4:
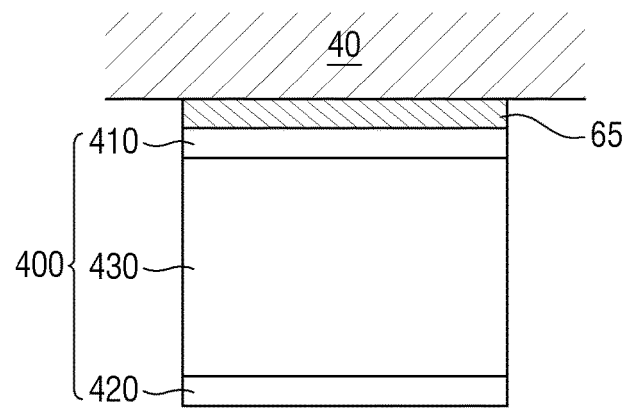
FIG. 4 is a cross-sectional view of a piezoelectric element according to an exemplary embodiment.
Figure 5:
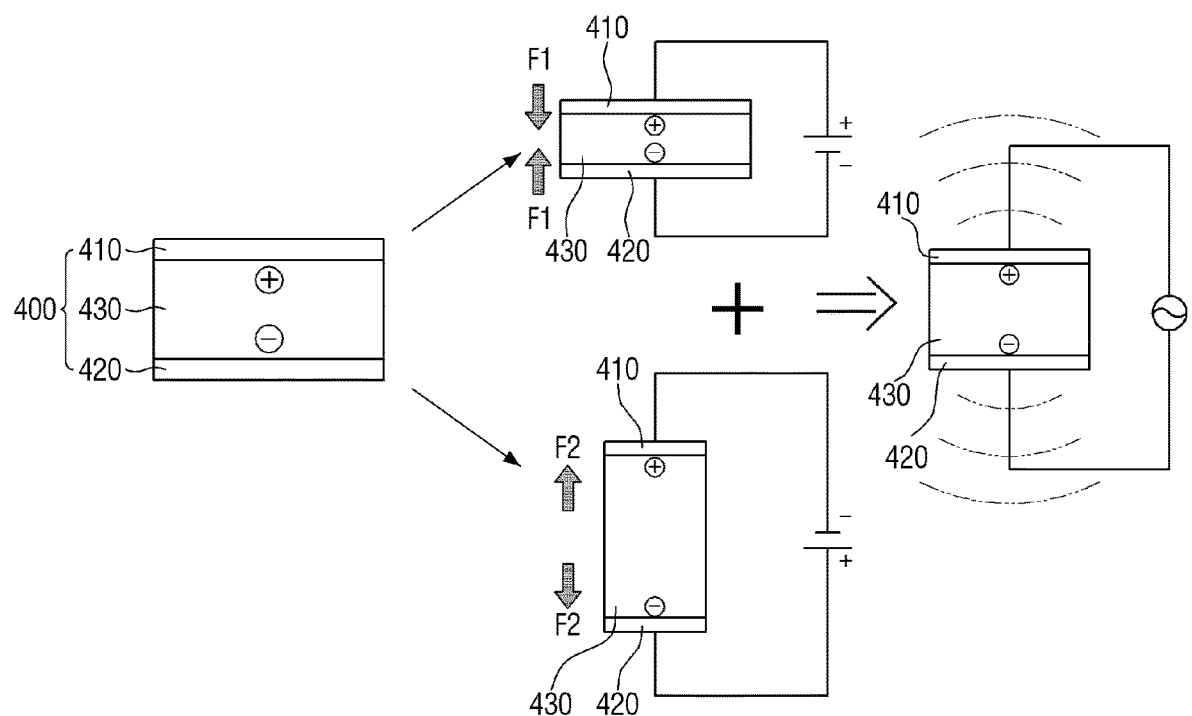
FIG. 5 is a conceptual diagram for explaining operating characteristics of a piezoelectric element.

FIG. 4 is a cross-sectional view of a piezoelectric element according to an exemplary embodiment. FIG. 5 is a conceptual diagram for explaining operating characteristics of a piezoelectric element.

Referring to FIGS. 4 and 5, the piezoelectric element 400 may include a first electrode 410, a second electrode 420 facing the first electrode 410, and a vibration material layer 430 interposed between the first electrode 410 and the second electrode 420. The piezoelectric element 400 may be attached to the cover panel 40 through an element bonding layer 65.

The first electrode 410 and the second electrode 420 may be made of a conductive material. For example, the first electrode 410 and the second electrode 420 may include a transparent conductor such as indium tin oxide (ITO) or indium zinc oxide (IZO), an opaque metal, a conductive polymer, a carbon nanotube (CNT), or the like.

The vibration material layer 430 may include a piezoelectric material that vibrates in response to an electric field. For example, the vibration material layer 430 may include at least one of a piezoelectric body such as lead zirconate titanate (PZT), a piezoelectric film such as a polyvinylidene fluoride (PVDF) film, and an electroactive polymer.

The vibration material layer 430 may be compressed or relaxed according to the polarity of a voltage. For example, as shown in FIG. 5, when a positive voltage is applied to the first electrode 410 and a negative voltage is applied to the second electrode 420, a compressive force F1 may occur in the vibration material layer 430 and the vibration material layer 430 may be compressed in the thickness direction. On the other hand, when a negative voltage is applied to the first electrode 410 and a positive voltage is applied to the second electrode 420, a relaxation force F2 may occur in the vibration material layer 430 and the vibration material layer 430 may expand in the thickness direction. Therefore, when an alternating voltage having alternating polarity is applied to the first electrode 410 and the second electrode 420, the vibration material layer 430 may repeat contraction and expansion. Due to this phenomenon, vibration may occur in the cover panel 40 and the display panel 10 adjacent to each other. The vibration generated by the piezoelectric element 400 may propagate along the display panel 10.

Figure 6:
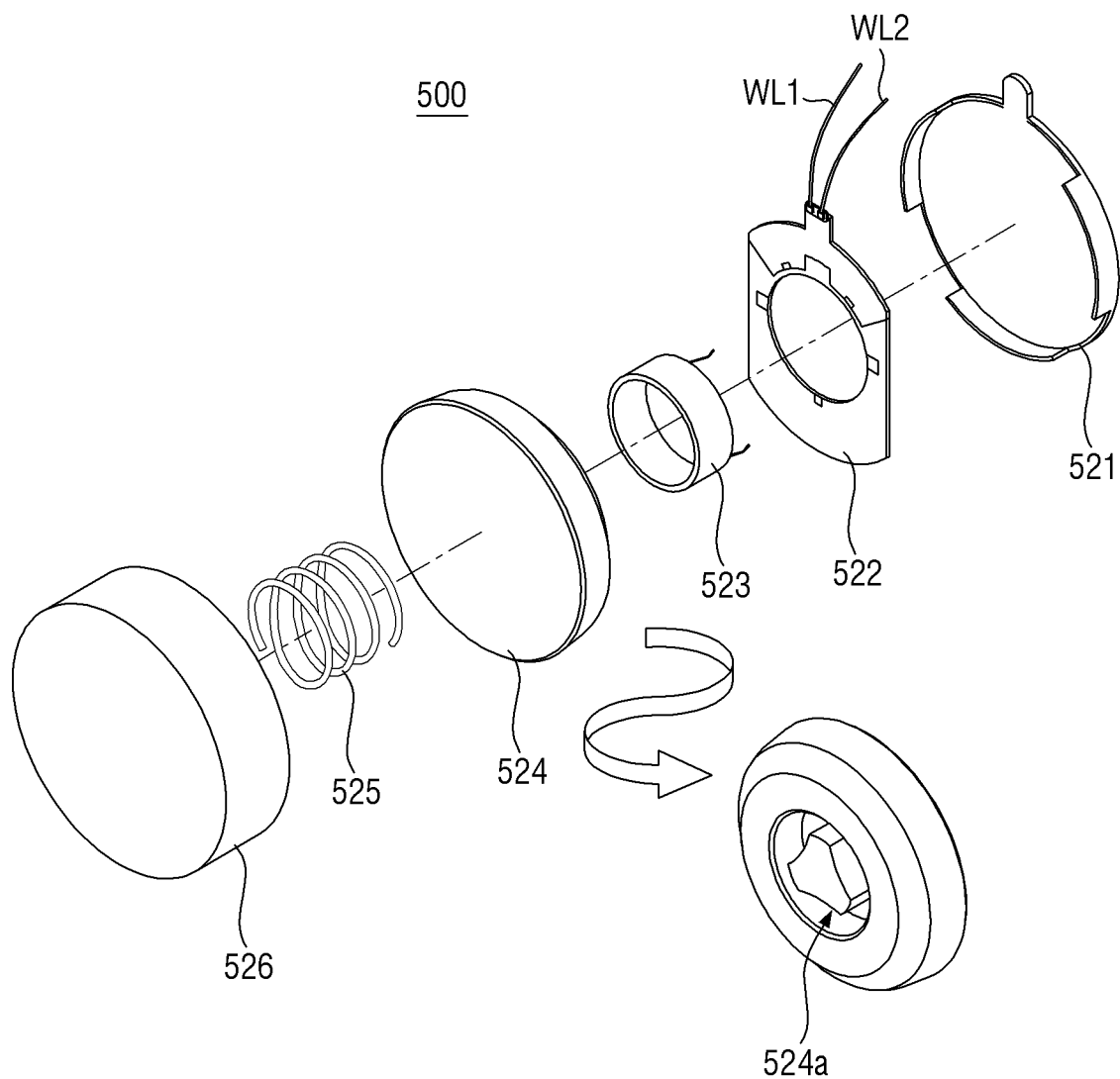
FIG. 6 is an exploded perspective view of an exciter according to an exemplary embodiment.
Figure 6:
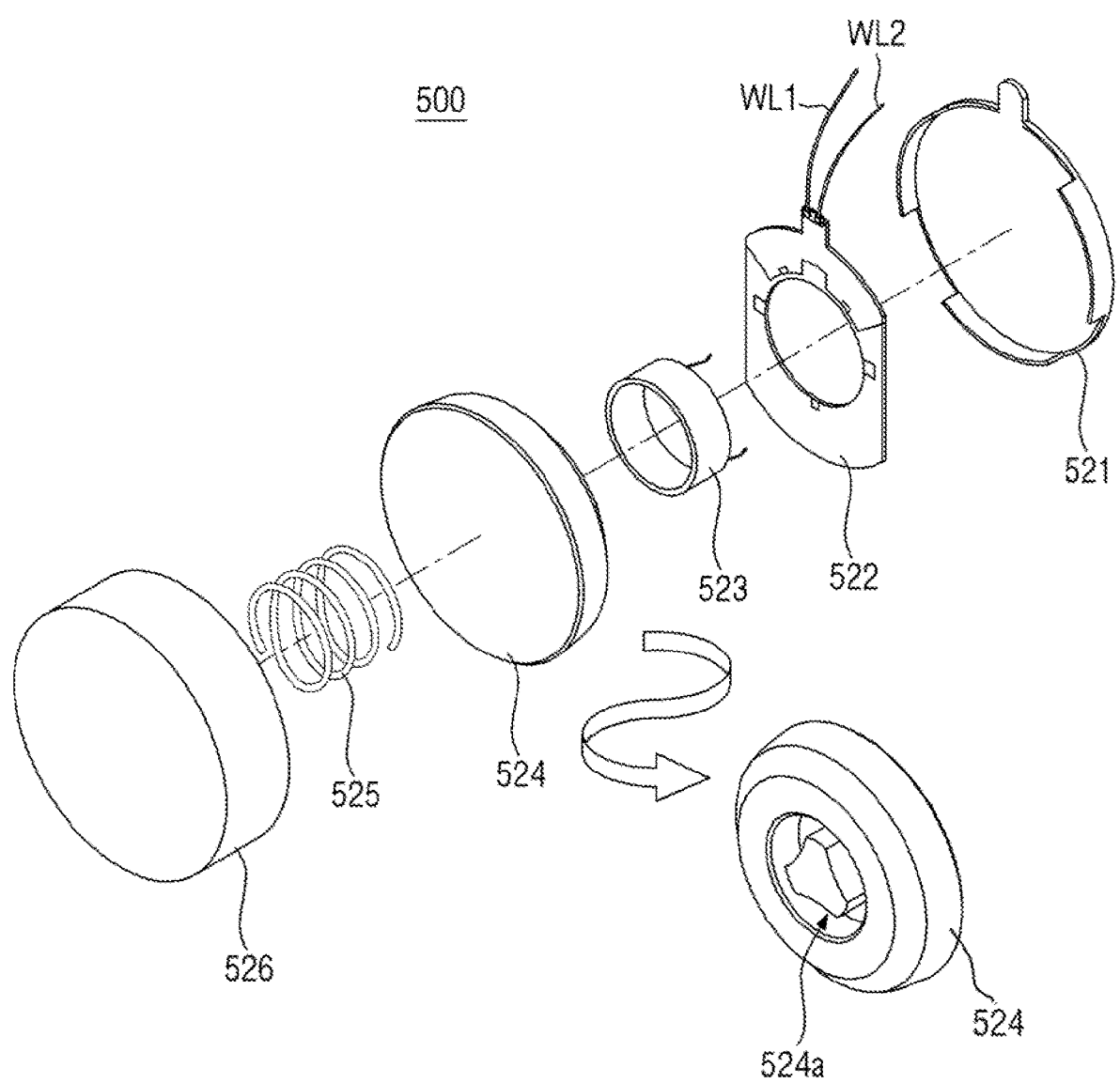

FIG. 6 is an exploded perspective view of an exciter according to an exemplary embodiment.

Referring to FIG. 6, the exciter 500 according to the exemplary embodiment may include a lower chassis 521, a flexible circuit board 522, a voice coil 523, a magnet 524, a spring 525, and an upper chassis 526. The lower chassis 521 and the upper chassis 526 may be formed of a metal material. The flexible circuit board 522 is disposed on one surface of the lower chassis 521 facing the upper chassis 526 and is connected to a first signal line WL1 and a second signal line WL2. The voice coil 523 may be connected to one surface of the flexible circuit board 522 facing the upper chassis 526. Thus, one end of the voice coil 523 may be electrically connected to the first signal line WL1 (or a first sound line), and the other end of the voice coil 523 may be electrically connected to the second signal line WL2 (or a second sound line). The magnet 524 is a permanent magnet, and a voice coil groove 524a in which the voice coil 523 is accommodated may be formed on one surface facing the voice coil 523. The spring 525 is disposed between the magnet 524 and the upper chassis 526.

The direction of the current flowing through the voice coil 523 may be controlled according to the first driving voltage applied to the first signal line WL1 and the second driving voltage applied to the second signal line WL2. According to the current flowing through the voice coil 523, a magnetic field may be generated around the voice coil 523. The attractive force and the repulsive force may alternately act between the magnet 524 and the voice coil 523 according to the AC driving of the first driving voltage and the second driving voltage. Accordingly, the magnet 524 may reciprocate between the voice coil 523 and the upper chassis 526 by the spring 525, which may cause a vibration surface disposed on the upper chassis 526 to vibrate.

FIG. 7 is a perspective view of an exciter according to another exemplary embodiment.

Referring to FIG. 7, an exciter 501 may include a magnet MG, a bobbin BB, a voice coil VC, and a damper DP.

The magnet MG is a permanent magnet, and a sintered magnet of barium ferrite may be used as the magnet MG. The magnet MG may be made of ferric trioxide ($Fe_2O_3$), barium carbonate ($BaCO_3$), neodymium magnet, strontium ferrite with improved magnetic properties, an alloy-casting magnet of cobalt (Co), nickel (Ni) or aluminum (Al), but the exemplary embodiments of the present disclosure are not limited thereto. For example, the neodymium magnet may be neodymium-iron-boron (Nd—Fe—B).

The magnet MG may be formed in a cylindrical shape. The magnet MG may include a central protrusion CPP protruding from the center of the plate and a sidewall portion SW protruding from an edge of the plate. The central protrusion CPP and the sidewall portion SW may be spaced apart from each other at a predetermined interval, and thus, a predetermined space may be formed between the central protrusion CPP and the sidewall portion SW. That is, a circular space may be provided on the bottom of the cylindrical magnet MG.

The central protrusion CPP of the magnet MG may have an N-polarity, and the plate and the sidewall portion SW of the magnet MG may have an S-polarity. Accordingly, an external magnetic field may be formed between the plate and the central protrusion CPP and between the central protrusion CPP and the sidewall portion SW of the magnet MG.

The bobbin BB may be formed in a cylindrical shape. The central protrusion CPP of the magnet MG may be disposed in the bobbin BB. That is, the bobbin BB may be disposed to surround the central protrusion CPP of the magnet MG. In addition, the sidewall portion SW of the magnet MG may be disposed outside the bobbin BB. That is, the sidewall portion SW of the magnet MG may be disposed to surround the bobbin BB. A space may be formed between the bobbin BB and the central protrusion CPP of the magnet MG and between the bobbin BB and the sidewall portion SW of the magnet MG.

The bobbin BB may be formed of a material processed from pulp or paper, aluminum or magnesium or an alloy thereof, synthetic resin such as polypropylene, or polyamide-based fibers.

The voice coil VC is wound on the outer circumferential surface of the bobbin BB. One end of the voice coil VC adjacent to one end of the bobbin BB may be connected to the first signal line (or the first sound line), and the other end of the voice coil VC adjacent to the other end of the bobbin BB may be connected to the second signal line (or the second sound line). Accordingly, a current may flow in the voice coil VC according to the first driving voltage applied to the first signal line and the second driving voltage applied to the second signal line. According to the current flowing through the voice coil VC, a magnetic field may be formed around the voice coil VC. According to the AC driving of the first driving voltage and the second driving voltage, the N-polarity and the S-polarity of the applied magnetic field formed around the voice coil VC are changed. Thus, the attractive force and the repulsive force may alternately act between the magnet 524 and the voice coil 523. Accordingly, the bobbin BB on which the voice coil VC is wound may reciprocate in the Z-axis direction, thereby vibrating the cover panel 40 and the display panel 10.

The damper DP may be disposed between a portion of the upper side of the bobbin BB and the sidewall portion SW of the magnet MG. The damper DP adjusts the vertical vibration of the bobbin BB while contracting and relaxing according to the vertical motion of the bobbin BB. Since the damper DP is connected to the bobbin BB and the sidewall portion SW of the magnet MG, the vertical motion of the bobbin BB may be limited by the restoring force of the damper DP. For example, when the bobbin BB vibrates with a predetermined height or more, or vibrates with a predetermined height or less, the bobbin BB may be returned to its original position by the restoring force of the damper DP.

Referring again to FIG. 3, the plurality of vibrators VBR may include a main vibrator VBR_M and a sub-vibrator VBR_S. In one exemplary embodiment, both the main vibrator VBR_M and the sub-vibrator VBR_S may include a piezoelectric element (400 in FIG. 4), or may include an exciter (500 in FIGS. 6 and 501 in FIG. 7). As another example, the main vibrator VBR_M may include any one of the piezoelectric element 400 and the exciter 500 and 501, and the sub-vibrator VBR_S may include the other one. When the main vibrator VBR_M or the sub-vibrator VBR_S is provided in plural, the vibrators VBR constituting the plurality of main vibrators VBR_M or the plurality of sub-vibrators VBR_S may have the same type, but may have different types. For example, some sub-vibrators VBR_S may include piezoelectric elements 400, and some sub-vibrators VBR_S may include exciters 500.

The main vibrator VBR_M may provide a main vibration wave to the display panel 10. The sub-vibrator VBR_S generates a sub-vibration wave. The sub-vibration wave may be an interference vibration wave that meets (or overlaps) the main vibration wave and constructively or destructively interferes with the main vibration wave to control the waveform, amplitude, etc. of the vibration wave transmitted to the display panel 10.

In one exemplary embodiment, the main vibrator VBR_M and the sub-vibrator VBR_S may be distinguished by the maximum amplitude of the vibration wave. For example, the main vibration wave generated by the main vibrator VBR_M may have a first maximum amplitude in a region where the main vibrator VBR_M is located, and the sub-vibration wave generated by the sub-vibrator VBR_S may have a second maximum amplitude in a region where the sub-vibrator VBR_S is located. In this case, the first maximum amplitude may be larger than the second maximum amplitude. However, the exemplary embodiments of the present disclosure are not limited thereto. The main vibration wave and the sub-vibration wave may have the same maximum amplitude. Alternatively, the vibrator VBR which forms a vibration wave with the maximum amplitude larger than the main vibration wave may be used as the sub-vibrator VBR_S.

In exemplary embodiments, each of the main vibrator VBR_M and the sub-vibrator VBR_S may have a shape extending in one direction. The sub-vibrator VBR_S may be disposed such that the longitudinal direction thereof is parallel to an adjacent edge. The length of the main vibrator VBR_M may be greater than that of the sub-vibrator VBR_S; however, the exemplary embodiments of the present disclosure are not limited thereto.

The sub-vibrator VBR_S may be disposed around the main vibrator VBR_M. The sub-vibrator VBR_S may be provided in plural. In one exemplary embodiment, the plurality of sub-vibrators VBR_S may at least partially surround one main vibrator VBR_M. The main vibrator VBR_M may be located in the central region of the display device 1 or the display panel 10, and the plurality of sub-vibrators VBR_S may be disposed along edges of the display device 1 or the display panel 10. The main vibrator VBR_M and the sub-vibrator VBR_S may be spaced apart from each other in the horizontal direction, and the sub-vibrators VBR_S may be spaced apart from each other. The separation distance between the main vibrator VBR_M and the sub-vibrator VBR_S disposed around it may be uniform, but may be different as shown in the figure. The separation distance between the sub-vibrators VBR_S may be uniform, but the exemplary embodiments of the present disclosure are not limited thereto.

The relative position of the sub-vibrator VBR_S and the main vibrator VBR_M is not limited by the example illustrated in FIG. 3. For example, in another embodiment, the sub-vibrator VBR_S may be disposed in the central region, and the main vibrator VBR_M may be disposed around it. In some cases, one vibrator VBR may serve as a main vibrator or a sub-vibrator according to a mode. For example, in a first mode (e.g., sound mode), the vibrator VBR located in the central region may serve as the main vibrator, and the vibrator VBR located around it may serve as the sub-vibrator to amplify or cancel out the main vibration wave of the main vibrator. In a second mode (e.g., haptic mode), the vibrator located in the central region may serve as the sub-vibrator to amplify or cancel out the main vibration wave of the main vibrator, and the vibrator located around it may serve as the main vibrator. Hereinafter, a case where the sub-vibrator VBR_S is disposed around the main vibrator VBR_M will be mainly described as an example. However, unless the description is based on a specified position, the same applies to an embodiment having the opposite position.

The phase of the main vibration wave generated by the main vibrator VBR_M and the phase of the sub-vibration wave generated by the sub-vibrator VBR_S may be different. In addition, the phases of the sub-vibration waves generated by the sub-vibrators VBR_S may be different from each other. Each sub-vibrator VBR_S may generate a sub-vibration wave having a different phase according to the separation distance from the main vibrator VBR_M. A detailed description thereof will be given later.

Figure 8:
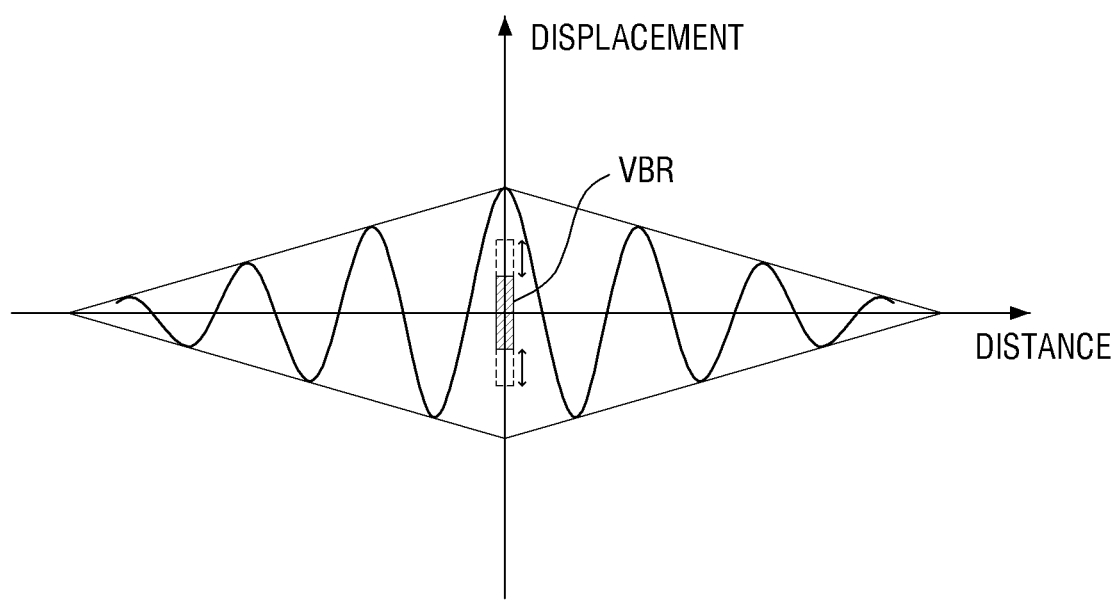
FIG. 8 is a graph illustrating a waveform according to the distance of the vibration wave of one vibrator.
Figure 9:
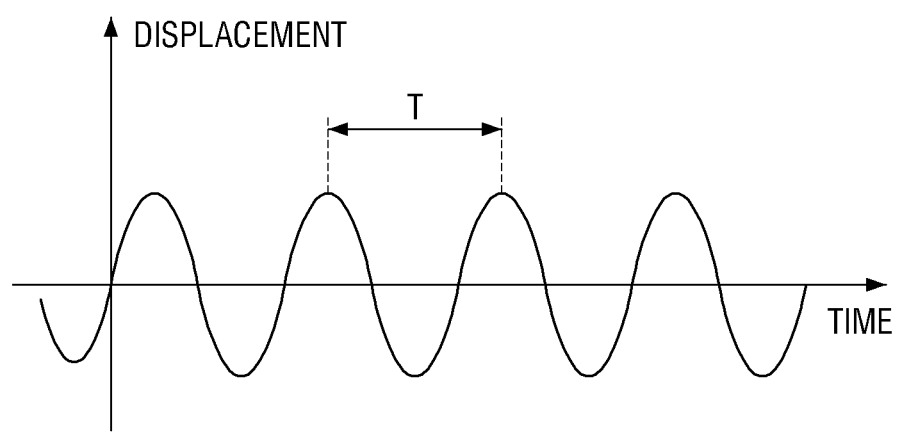
FIG. 9 is a graph showing a vibration waveform over time in a medium at a certain distance when the vibrator operates.

FIG. 8 is a graph illustrating a waveform according to the distance of the vibration wave of one vibrator. FIG. 9 is a graph showing a vibration waveform over time in a medium at a certain distance when the vibrator operates.

As shown in FIG. 8, the vibration wave is generated in a region where the vibrator VBR is located and propagates to the surroundings. The amplitude (or a displacement) of the vibration wave depends on the distance away from the region where the vibrator VBR is located. In general, the amplitude of the vibration wave may decrease as it moves away from the position of the vibrator VBR. While one vibrator VBR vibrates uniformly, the amplitude of the vibration wave at a specific position may be maintained uniformly, as shown in FIG. 9. As described above, the vibrator VBR repeats contraction and expansion while driving the vibrator VBR, and a vibration period T of the vibration wave may be defined by a cycle of contraction/ expansion of the vibrator VBR. The vibration period T of the vibration wave may be the same regardless of the position, but the exemplary embodiments of the present disclosure are not limited thereto.

The vibration wave is a kind of wave, and when multiple waves are mixed, constructive or destructive interference can occur. Here, constructive interference refers to a case where the vibration waves are superimposed and the amplitude at a specific position becomes larger, and destructive interference refers to a case where the vibration waves are superimposed and the amplitude at a specific position becomes smaller. The constructive interference has the greatest amplitude increasing effect when the superimposed vibration waves have the same phase, and the destructive interference has the greatest amplitude decreasing effect when the phases of the superimposed vibration waves are reversed (i.e., a phase difference of 180°). However, constructive and destructive interference of the exemplary embodiments of the present disclosure are not limited to the above-described phase relationship. Even if there is a slight difference from the phase relationship, it is referred to as constructive interference when the amplitude becomes larger than that of a single vibration wave and it is referred to as destructive interference when the amplitude becomes smaller than that of a single vibration wave.

Figure 10:
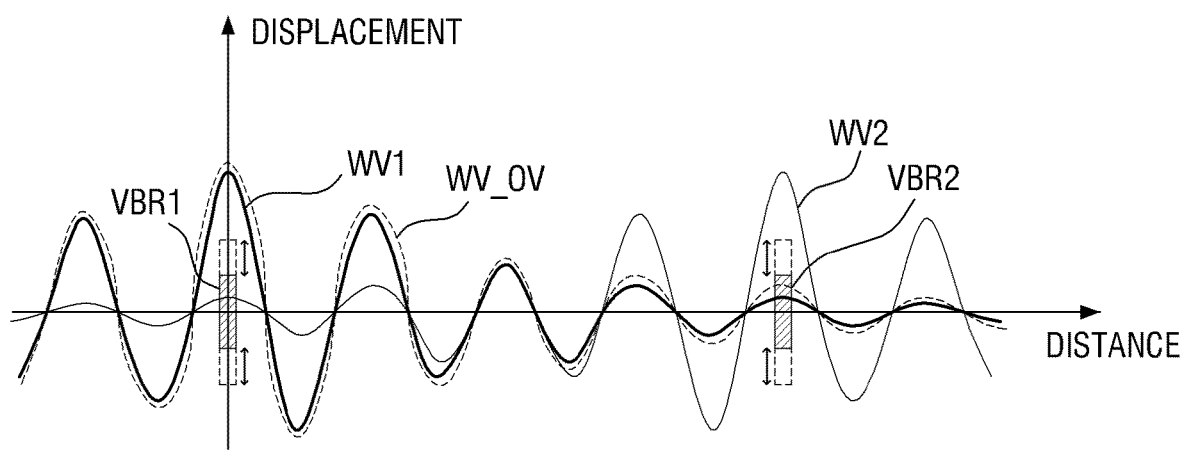
FIGS. 10 and 11 are graphs illustrating superimposed waveforms of vibration waves of two vibrators according to phase differences.
Figure 11:
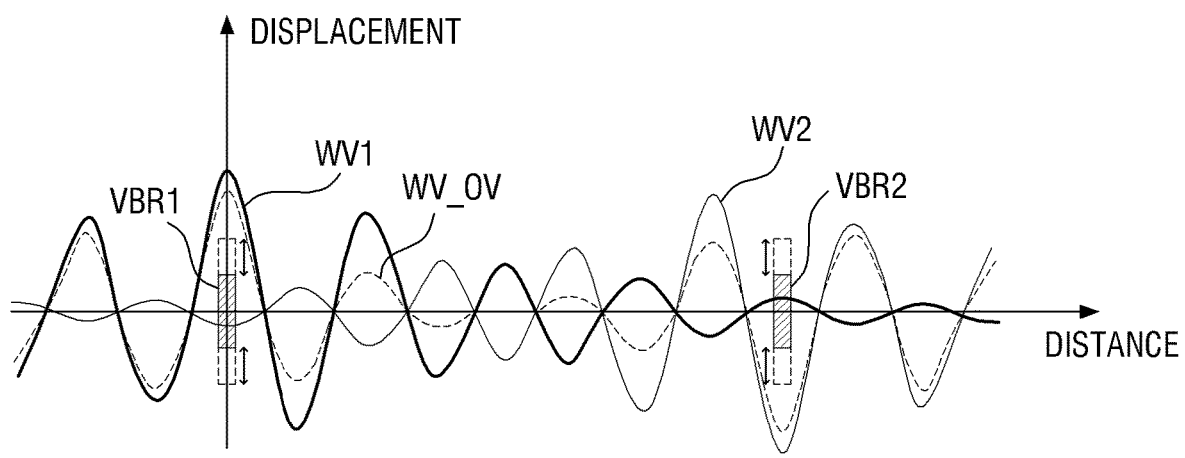

FIGS. 10 and 11 are graphs illustrating superimposed waveforms of vibration waves of two vibrators according to phase differences.

FIG. 10 is a graph when a first vibration wave WV1 generated by a first vibrator VBR1 and a second vibration wave WV2 generated by a second vibrator VBR2 at a specific position have the same phase at the same time point. As shown in FIG. 10, when the first vibration wave WV1 and the second vibration wave WV2 have the same phase at a specific position, constructive interference occurs while their waveforms overlap each other. That is, the first vibration wave WV1 and the second vibration wave WV2 are added together, and the amplitude thereof becomes large. The amplitude of a superimposed vibration wave WV_OV at a specific position may be the sum of the amplitude of the first vibration wave WV1 and the amplitude of the second vibration wave WV2.

FIG. 11 is a graph when the first vibration wave WV1 generated by the first vibrator VBR1 and the second vibration wave WV2 generated by the second vibrator VBR2 at a specific position have opposite phases at the same time point. As shown in FIG. 11, when the first vibration wave WV1 and the second vibration wave WV2 have opposite phases (i.e., a phase difference of 180°), interference occurs such that their waveforms are cancelled out. In other words, the superimposed vibration wave WV_OV at the specific position in this case is a difference between an absolute value of the first vibration wave WV1 and an absolute value of the second vibration wave WV2, and the amplitude thereof becomes smaller than when only a single vibration wave is present. If the first vibration wave WV1 and the second vibration wave WV2 have the same amplitude and opposite phases at a specific position, vibration may not occur at the corresponding position.

By using this phenomenon, it is possible to amplify or reduce the magnitude of the vibration wave transmitted through the medium. For example, in order to implement a precise haptic operation, it is preferable to maintain or increase the magnitude of vibration in a location where a touch input is made and to reduce vibration in other areas. In a region around the touch area, the amplitude may be increased through constructive interference of the waveform in the same manner as in FIG. 10. In a region far from the touch area, the amplitude may be reduced by causing destructive interference of the waveform in the same manner as in FIG. 11. If only one of constructive interference and destructive interference needs to be driven, selecting and driving destructive interference may be more effective in accentuating vibration at a specific position only.

In FIGS. 10 and 11, the phases of the first vibration wave WV1 and the second vibration wave WV2 may be adjusted by adjusting the phases of AC voltages applied to the first electrode and the second electrode of each vibrator VBR. For example, assuming that both vibrators VBR use the piezoelectric element 400 illustrated in FIG. 4, at a time point when a positive maximum voltage of the AC voltage is applied to the first electrode of the first vibrator VBR1, vibration waves of the same phase may be generated when a positive maximum voltage of the AC voltage is applied to the first electrode of the second vibrator VBR2, and vibration waves of opposite phases may be generated when a positive maximum voltage of the AC voltage is applied to the second electrode of the second vibrator VBR2.

Meanwhile, FIGS. 10 and 11 illustrate a case where the separation distance between the first vibrator VBR1 and the second vibrator VBR2 is an integer multiple of ½ of the wavelength of the first vibration wave WV1 and the second vibration wave WV2. This is a method of causing the phase of the second vibration wave WV2 to have the same phase or a phase difference of 180° with respect to the phase of the first vibration wave WV1. In this method, when using the vibrator VBR having a predetermined wavelength, if the position of one vibrator VBR is determined, a candidate position of another vibrator VBR may also be specified. For example, when the position of the main vibrator VBR_M is determined, the plurality of sub-vibrators VBR_S around the main vibrator need to be disposed at the same interval from the main vibrator VBR_M. This may be an obstacle to variously modifying the arrangement of the vibrators VBR on the display panel 10 due to a touch input position or other reasons. In addition, when the wavelength of the vibrator VBR is greater than the size of the display panel 10 and the vibrators cannot be separated by an integer multiple of ½ of the wavelength, it is difficult to realize constructive and destructive interference by the same phase (0° phase difference) and the opposite phase (180° phase difference) method described above. This may result in limiting the vibrator VBR used in the display device 1 for constructive and destructive interference to the vibrator VBR generating short wavelength vibration waves.

In order to enable constructive and destructive interference even when long-wave vibrators VBR are arranged at various intervals, the phase of the vibrator VBR according to the embodiment may be adjusted according to a distance (separation distance) from the surrounding vibrator VBR. The phase difference of the vibration wave of the other vibrator VBR with respect to the phase of the vibration wave of one vibrator VBR may have various other values as well as the above-mentioned 0° and 180°. In one exemplary embodiment, the phase difference of the vibration wave of the other vibrator VBR with respect to the phase of the vibration wave of one vibrator VBR may be greater than 0° and less than 180°.

Figure 12:
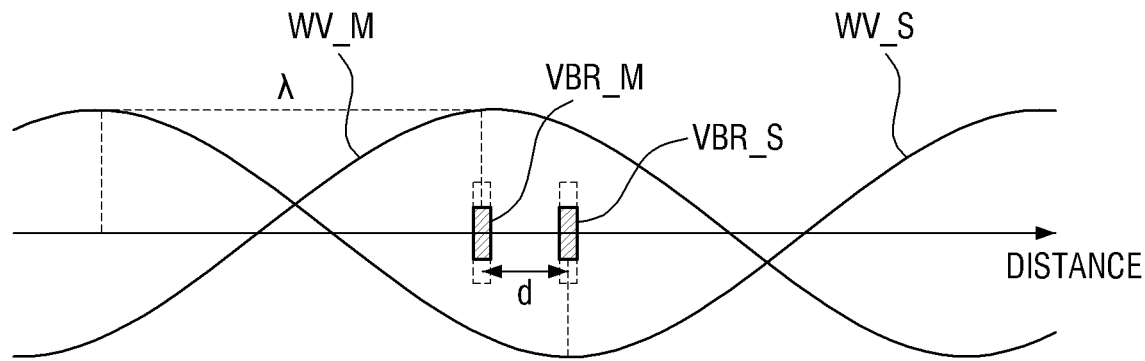
FIG. 12 is a schematic diagram illustrating an arrangement of a main vibrator and a sub-vibrator and vibration waves thereof according to an exemplary embodiment.

FIG. 12 is a schematic diagram illustrating an arrangement of a main vibrator and a sub-vibrator and vibration waves thereof according to an exemplary embodiment.

Referring to FIG. 12, each of the main vibrator VBR_M and the sub-vibrator VBR_S has a wavelength of λ, and the main vibrator VBR_M and the sub-vibrator VBR_S have a distance d. Here, d may be smaller than ½ of λ.

As described above, in order to cancel out a main vibration wave WV_M of the main vibrator VBR_M, a sub-vibration wave WV_S of the sub-vibrator VBR_S preferably has an opposite phase. That is, it is preferable that when the main vibration wave WV_M has a peak (the highest part of the wave) at the position of the sub-vibrator VBR_S, the sub-vibration wave WV_S of the sub-vibrator VBR_S has a valley (the lowest part of the wave). The valley and peak have a phase difference of 180°. However, since it takes time for the main vibration wave WV_M to travel to the position of the sub-vibrator VBR_S, when the actual main vibration wave WV_M has a peak at the position of the sub-vibrator VBR_S, the main vibration wave WV_M at the position of the main vibrator VBR_M may have a phase other than the peak. Therefore, in terms of the driving of the vibrators VBR, it is necessary to reflect such a phase difference so that the maximum destructive interference can be achieved at the actually overlapping part.

When the phase of the main vibration wave WV_M in the region where the main vibrator VBR_M is located is θ1, and the phase of the position separated by d from the main vibrator VBR_M is θ2, the difference between phases θ1-θ2 may satisfy the following equation 1:

$$\theta1-\theta2=(360°*d)\lambda, \qquad \text{Eq. 1}$$

Therefore, in order to amplify or cancel out the main vibration wave WV_M, the phase difference of the sub-vibrator VBR_S at the position separated by d from the main vibrator VBR_M may satisfy the following equation 2:

$$\Delta\theta=180°*n-(360°*d)/\lambda \qquad \text{Eq. 2}$$

In Eq. 2, n is an integer, and Δθ represents a difference (i.e., phase retardation value) between the phase of the sub-vibration wave WV_S of the sub-vibrator VBR_S and the phase of the main vibration wave WV_M. Here, if the phase difference or phase retardation value is positive, it may mean that the phase of the sub-vibration wave WV_S is delayed by the corresponding value compared to the main vibration wave WV_M, and if the phase difference or phase retardation value is negative, it may mean that the phase of the sub-vibration wave WV_S is earlier than the main vibration wave WV_M by the corresponding value. Further, the phase difference may mean a difference in phase at the same time point.

When n is an even number in Eq. 2, the phase retardation value is substantially equal to $-(360°*d)/\lambda$. In this case, when the sub-vibration wave WV_S of the sub-vibrator VBR_S has a phase difference of $-(360°*d)/\lambda$ with respect to the main vibration wave WV_M of the main vibrator VBR_M, since both the main vibration wave WV_M and the sub-vibration wave WV_S have a peak at the position of the sub-vibrator VBR_S, effective constructive interference can be achieved.

When n is an odd number in Eq. 2, the phase retardation value is substantially equal to $180°-(360°*d)/\lambda$. In this case, when the main vibration wave WV_M has a peak at the position of the sub-vibrator VBR_S, since the sub-vibration wave WV_S has a valley, effective destructive interference can be achieved. When the wavelength of the main vibration wave WV_M is the same as the wavelength of the sub-vibration wave WV_S, the superimposed main vibration wave WV_M and sub-vibration wave WV_S may have destructive interference in the same manner regardless of the position along the traveling direction of the superimposed wave.

Figure 13:
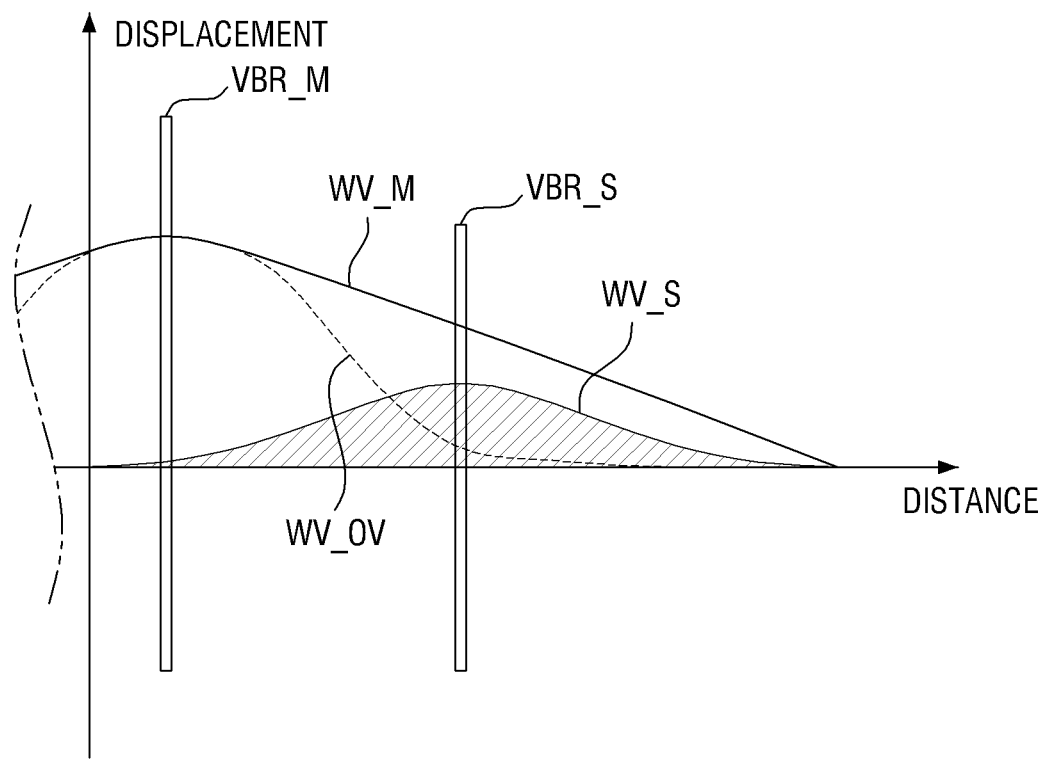
FIG. 13 is a graph showing a vibration intensity (or a displacement) of the vibration waves according to the distance.

FIG. 13 is a graph showing a vibration intensity (or a displacement) of the vibration waves according to the distance. FIG. 13 illustrates the vibration intensity at the time of causing the maximum destructive interference such that the phase of the sub-vibration wave WV_S of the sub-vibrator VBR_S has a phase difference of $180°-(360°*d)/\lambda$ with respect to the phase of the main vibration wave WV_M of the main vibrator VBR_M in FIG. 12.

Referring to FIG. 13, as described above, the farther the vibration wave is from the vibrator VBR, the smaller the vibration intensity becomes. The main vibration wave WV_M generated by the main vibrator VBR_M may be most cancelled out when reaching the position of the sub-vibrator VBR_S that generates a maximum sub-vibration wave VW_S. Even before and after the sub-vibrator VBR_S, the main vibration wave WV_M may be cancelled out to reduce the vibration intensity. Also in a part where the main vibrator VBR_M is located, the vibration intensity of the main vibration wave WV_M may be reduced due to an influence of the sub-vibration wave WV_S. However, also in the case of the sub-vibration wave WV_S, as it moves away from the sub-vibrator VBR_S, the vibration intensity decreases. Accordingly, at the actual position of the main vibrator VBR_M, the degree of cancellation of the vibration intensity of the main vibration wave WV_M is relatively small. Therefore, the superimposed vibration wave WV_OV maintains a strong vibration intensity in the vicinity of a region where the main vibrator VBR_M is located, but the vibration intensity may decrease rapidly as it is further away from it. In this manner, when performing a haptic operation, the vibration can be selectively generated only at a place where an actual touch input is made, thereby realizing a precise haptic operation. In the same manner, since precise vibration control is possible, precise sound control can be performed when the vibration member is used as a sound generating element or the like.

In order to confirm the superposition result of the plurality of vibration waves described above, two vibrators VBR were attached to the panel, and a gravitational force equivalent (G) value according to the phase was measured. The vibrators VBR were attached to one side of the panel, and a G sensor was placed on the other surface of the panel. One vibrator VBR was attached at a distance of 3 cm to the left from the center of the panel, and the other vibrator VBR was attached at a distance of 3 cm to the right from the center of the panel. The separation distance between the vibrators was 6 cm. The wavelength of each vibrator VBR was 1.93 m. The G sensor was placed at the center of the panel.

First, the same voltage of 250 Hz and 5 Vpp was applied to each vibrator VBR using a function generator. After checking the bending wave speed of the panel, a phase difference was applied. The G value was measured while changing the phase. In addition, a level in decibels (dB) was measured at a distance of 30 cm away.

Figure 14:
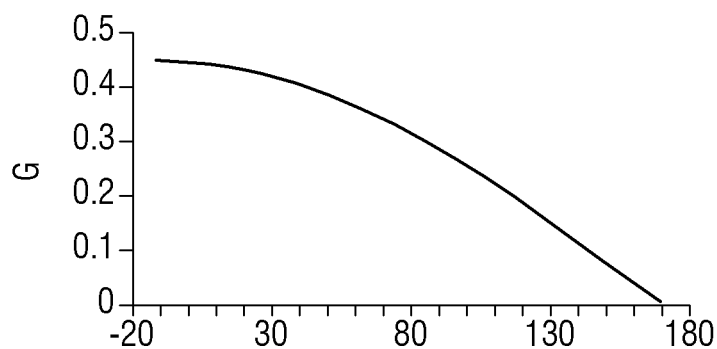
FIG. 14 is a graph showing a relationship between a gravitational force equivalent (G) value and phase difference.
Figure 15:
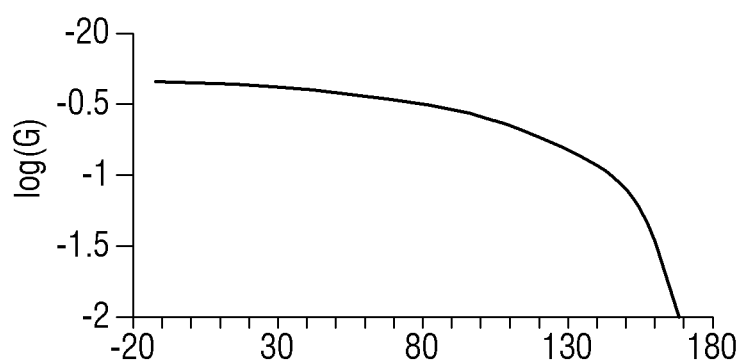
FIG. 15 is a graph showing a relationship between log(G) value and phase difference.
Figure 16:
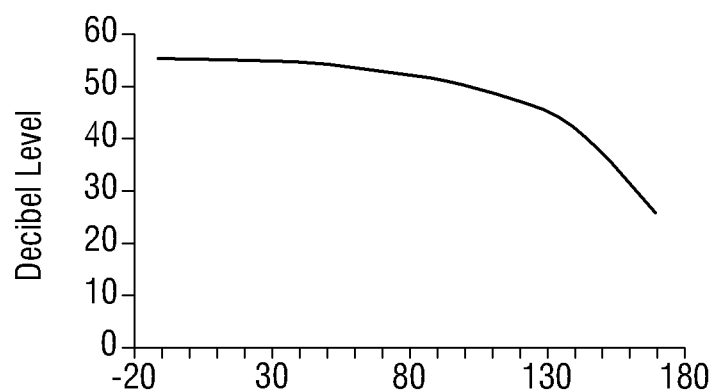
FIG. 16 is a graph showing a decibel level according to the phase difference.

Results according to the above experiment are shown in FIGS. 14, 15, and 16. FIG. 14 is a graph showing a relationship between G value and phase difference. FIG. 15 is a graph showing a relationship between log(G) value and phase difference. FIG. 16 is a graph showing a decibel level according to the phase difference.

Referring to FIGS. 14, 15, and 16, in the above experimental example, the G value was 0 when the phase difference was 168.8° (=180°−11.2°). In the corresponding phase, the decibel level was below 30 dB, indicating a level that can be controlled as basic noise. It was confirmed that the log(G) graph generally coincides with the decibel level graph.

Referring again to FIG. 3, the main vibrator VBR_M may be disposed in the central region of the cover panel 40 (or the display panel 10 overlapping the cover panel 40 in the thickness direction), and the plurality of sub-vibrators VBR_S may be disposed along edges of the cover panel 40 (or the display panel 10 overlapping the cover panel 40 in the thickness direction). In one exemplary embodiment, one main vibrator VBR_M may be located in the center of the cover panel 40. The sub-vibrators VBR_S may be arranged in a row. The array of the sub-vibrators VBR_S may have a rectangular shape similarly to the cover panel 40. Each sub-vibrator VBR_S may be disposed at substantially the same distance from the edge of the cover panel 40. The spacing of the neighboring sub-vibrators VBR_S disposed at each edge of the cover panel 40 may be uniform, but the exemplary embodiments of the present disclosure are not limited thereto.

When the cover panel 40 has a rectangular shape in plan view, even if the main vibrator VBR_M is located in the central region of the cover panel 40, the separation distance between the main vibrator VBR_M in the central region and the sub-vibrators VBR_S in the edge portion may be different. For example, one sub-vibrator VBR_S may be separated from the main vibrator VBR_M by a first distance d1, and another sub-vibrator VBR_S may be separated from the main vibrator VBR_M by a second distance d2.

Here, the separation distance d1, d2 may refer to a distance at which the main vibrator and the sub-vibrator are separated from each other based on the position where the vibration wave of the vibrator VBR is generated. When the entire region where the vibrator VBR is disposed provides uniform vibration, the vibration wave may propagate from the edge of the vibrator VBR. In this case, the separation distance d1, d2 between the vibrators VBR may be measured as the shortest distance between the edges of the adjacent vibrators VBR as shown in FIG. 3. If the vibration wave generated by the vibrator VBR has a maximum value at a specific position or in a specific line inside the vibrator VBR and propagates therefrom, the shortest distance between the specific positions or the specific lines of the respective vibrators VBR may be measured as the separation distance d1, d2.

For constructive interference driving to apply the overall vibration to the display panel 10, when the vibration wave wavelength of each vibrator VBR is $\lambda$, it may be driven from Eq. 2 above such that the vibration wave of the sub-vibrator VBR_S at the first distance d1 has a phase retardation value of $\{180°*2\ m\ (360°*d1)/\lambda\}$ with respect to the vibration wave of the main vibrator VBR_M, and the vibration wave of the sub-vibrator VBR_S at the second distance d2 has a phase retardation value of $\{180°*2\ m-(360°*d2)/\lambda\}$ with respect to the vibration wave of the main vibrator VBR_M. If the first distance d1 and the second distance d2 are different from each other, the phase of the vibration wave of the sub-vibrator VBR_S at the first distance d1 and the phase of the vibration wave of the sub-vibrator VBR_S at the second distance d2 may also be different from each other.

Further, for destructive interference driving to implement a precise haptic operation around the main vibrator VBR_M, it may be driven such that the vibration wave of the sub-vibrator VBR_S at the first distance d1 has a phase retardation value of $\{180°*(2\ m+1)-(360°*d1)/\lambda\}$ with respect to the vibration wave of the main vibrator VBR_M, and the vibration wave of the sub-vibrator VBR_S at the second distance d2 has a phase retardation value of $\{180°*(2\ m+1)-(360°*d2)/\lambda\}$ with respect to the vibration wave of the main vibrator VBR_M. If the first distance d1 and the second distance d2 are different from each other, the phase of the vibration wave of the sub-vibrator VBR_S at the first distance d1 and the phase of the vibration wave of the sub-vibrator VBR_S at the second distance d2 may also be different from each other.

As described above, when the phase of the vibration wave of each vibrator VBR is adjusted differently according to the separation distance, even though the vibrators VBR are arranged at various intervals, constructive/destructive interference driving can be effectively performed. For phase control of each vibrator VBR, the display device 1 may further include a phase controller (not shown) capable of driving each vibrator VBR in various phases. The phase controller may control the phase of each vibration wave by adjusting the phase of the AC voltage provided to each vibrator VBR.

Hereinafter, other embodiments will be described.

Figure 17:
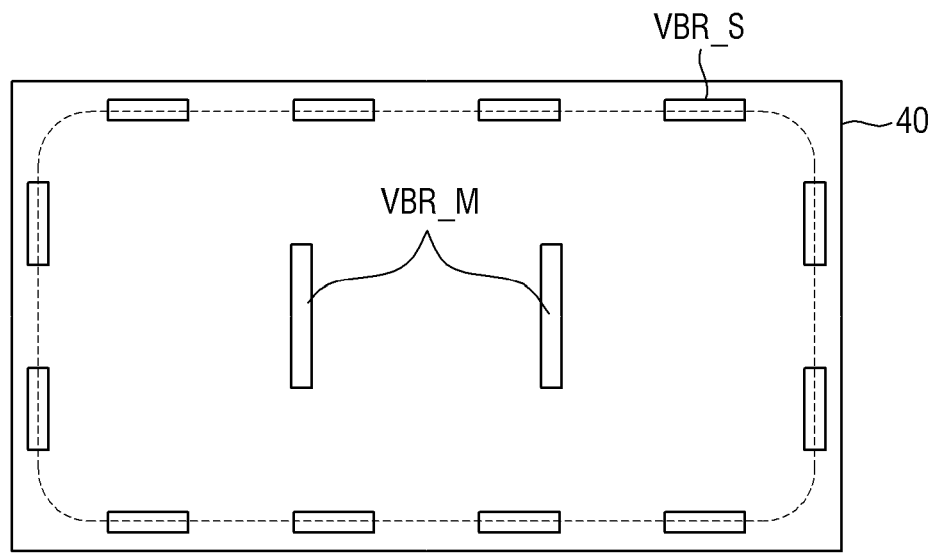
FIG. 17 is a layout diagram of a cover panel and vibrators according to another exemplary embodiment.
Figure 18:
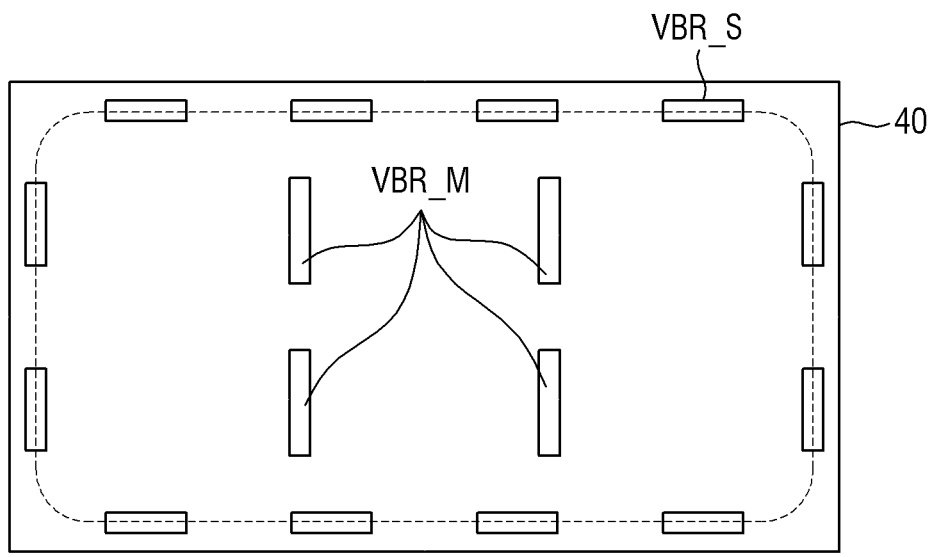
FIG. 18 is a layout diagram of a cover panel and vibrators according to still another exemplary embodiment.

FIG. 17 is a layout diagram of a cover panel and vibrators according to another exemplary embodiment. FIG. 18 is a layout diagram of a cover panel and vibrators according to still another exemplary embodiment.

In the embodiments of FIGS. 17 and 18, the display device 1 may include a plurality of main vibrators VBR_M. As shown in FIG. 17, the plurality of main vibrators VBR_M may be disposed in a row at a predetermined interval in a central region of the cover panel 40. As shown in FIG. 18, the plurality of main vibrators VBR_M may be disposed in plural rows (two rows in the drawing) at predetermined intervals in a central region of the cover panel 40. The sub-vibrators VBR_S may be disposed around the outer side of the array of the plurality of main vibrators VBR_M. The sub-vibrators VBR_S may not be disposed between the main vibrators VBR_M.

In some embodiments, the main vibrator VBR_M may generate a main vibration wave or a sub-vibration wave. In one driving mode, each of the plurality of main vibrators VBR_M may generate a main vibration wave. The phases of the main vibration waves of the respective main vibrators VBR_M may be adjusted such that constructive interference occurs between them. The sub-vibrators VBR_S outside the array of the main vibrators VBR_M may be driven to have a phase difference such that destructive interference occurs between the superimposed main vibration waves of the main vibrators VBR_M.

In another driving mode, some of the plurality of main vibrators VBR_M may generate a main vibration wave, and another main vibrator VBR_M may generate a vibration wave that cancels out the main vibration wave. In one exemplary embodiment, among the plurality of main vibrators VBR_M, the vibrator VBR generating the main vibration wave is a vibrator VBR close to the position where a touch input is made, the remaining main vibrators VBR_M may generate sub-vibration waves (or destructive interference vibration waves). The sub-vibrators VBR_S outside the array of the main vibrators VBR_M may be driven to have a phase difference such that more destructive interference occurs between the superimposed vibration waves of the main vibrators VBR_M.

Figure 19:
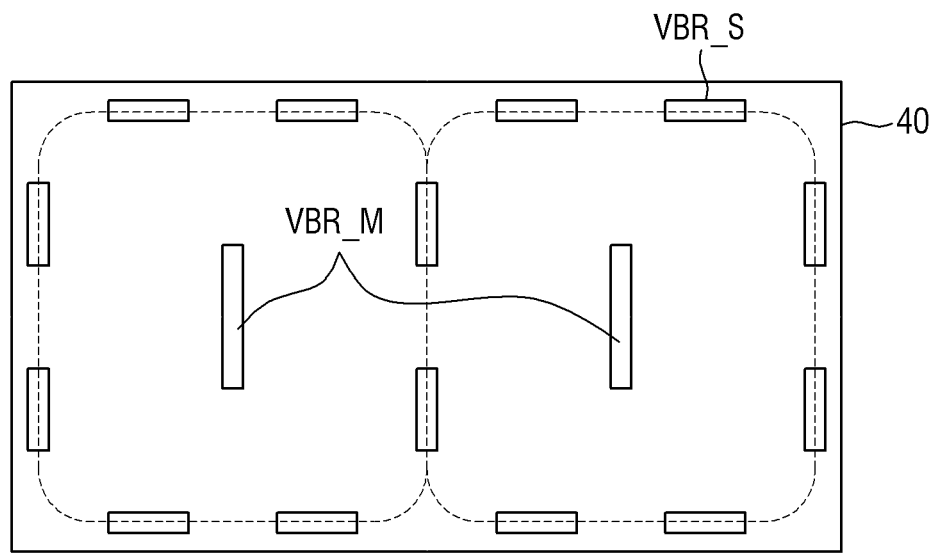
FIG. 19 is a layout diagram of a cover panel and vibrators according to still another exemplary embodiment.

FIG. 19 is a layout diagram of a cover panel and vibrators according to still another exemplary embodiment. Referring to FIG. 19, the present embodiment is the same as the embodiment of FIG. 17 in that a plurality of main vibrators VBR_M are arranged in a row, but is different from the embodiment of FIG. 17 in that a plurality of sub-vibrators VBR_S are disposed between the main vibrators VBR_M.

Specifically, the sub-vibrators VBR_S are disposed not only on the edges of the cover panel 40 but also in the central region between the main vibrators VBR_M. Each main vibrator VBR_M may be surrounded by the sub-vibrators VBR_S. Each main vibrator VBR_M may generate a main vibration wave, and the sub-vibrators VBR_S may generate sub-vibration waves that constructively or destructively interfere with the main vibration waves. The main vibration wave generated by the main vibrator VBR_M may be interfered by the sub-vibrators VBR_S surrounding the main vibrator VBR_M. The sub-vibrators VBR_S between the main vibrators VBR_M may be arranged in a row and may generate sub-vibration waves for all adjacent main vibrators VBR_M. That is, the sub-vibrators VBR_S between the main vibrators VBR_M may be shared to interfere with the main vibration waves on both sides.

Figure 20:
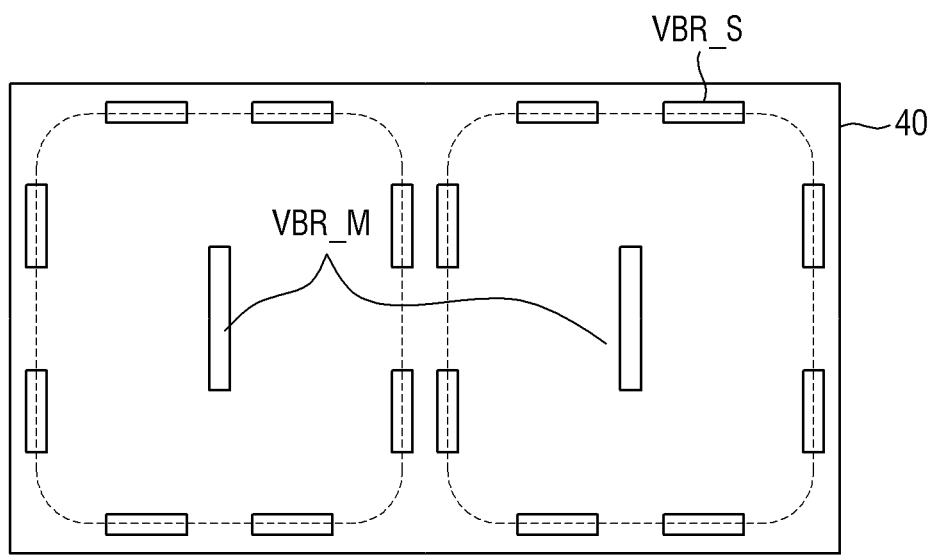
FIG. 20 is a layout diagram of a cover panel and vibrators according to still another exemplary embodiment.

FIG. 20 is a layout diagram of a cover panel and vibrators according to still another exemplary embodiment. Referring to FIG. 20, the present embodiment is the same as the embodiment of FIG. 19 in that a plurality of sub-vibrators VBR_S are disposed between the main vibrators VBR_M, but is different from the embodiment of FIG. 19 in that the plurality of sub-vibrators VBR_S between the main vibrators VBR_M are arranged in two rows. A first row of sub-vibrators VBR_S between the main vibrators VBR_M may generate sub-vibration waves that interfere with the main vibration wave of the main vibrator VBR_M on one side, and a second row of sub-vibrators VBR_S between the main vibrators VBR_M may generate sub-vibration waves that interfere with the main vibration wave of the main vibrator VBR_M on the other side.

Figure 21:
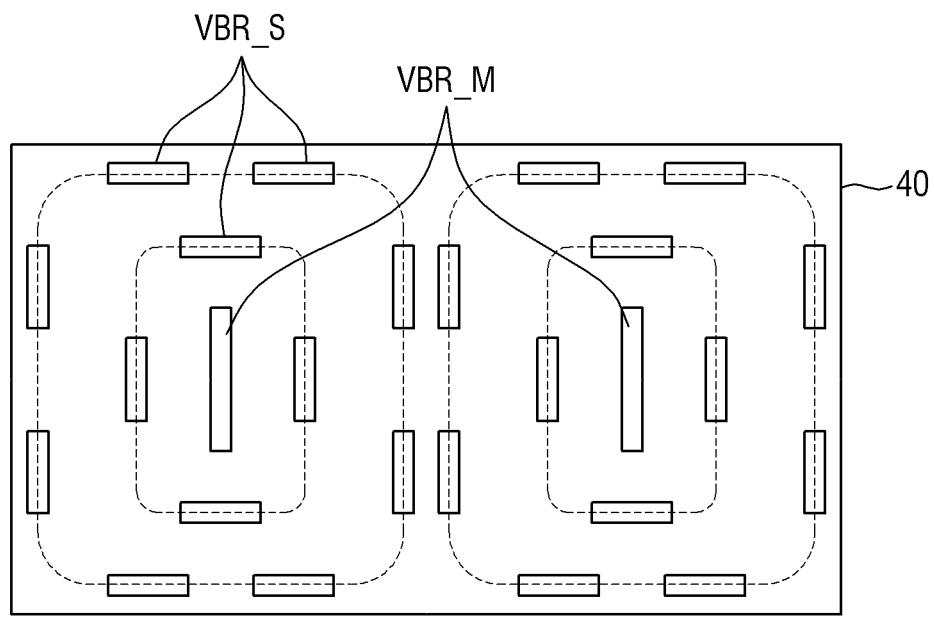
FIG. 21 is a layout diagram of a cover panel and vibrators according to still another exemplary embodiment.

FIG. 21 is a layout diagram of a cover panel and vibrators according to still another exemplary embodiment. In the embodiment of FIG. 21, one main vibrator VBR_M may be surrounded by a plurality of rows of sub-vibrators VBR_S. Specifically, the present embodiment differs from the embodiment of FIG. 19 in that the sub-vibrators VBR_S surrounding each main vibrator VBR_M are arranged in two rows. The sub-vibrators VBR_S in a first row and the sub-vibrators VBR_S in a second row may be alternately arranged, but the exemplary embodiments of the present disclosure are not limited thereto. Three rows of sub-vibrators VBR_S may be disposed between the main vibrators VBR_M, and the sub-vibrators VBR_S in the middle row may be shared to interfere with the main vibration waves on both sides.

Figure 22:
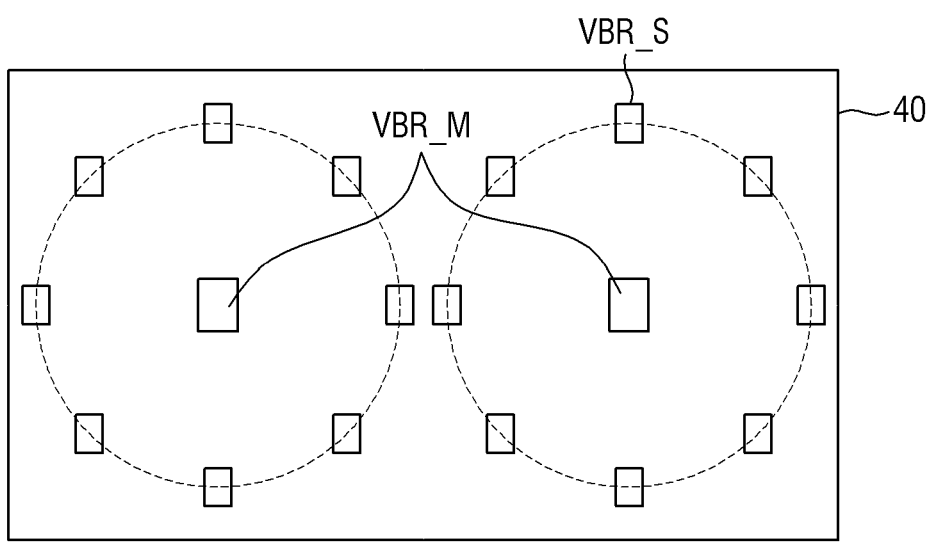
FIG. 22 is a layout diagram of a cover panel and vibrators according to still another exemplary embodiment.

FIG. 22 is a layout diagram of a cover panel and vibrators according to still another exemplary embodiment. The present embodiment is the same as the embodiment of FIG. 20 in that a plurality of sub-vibrators VBR_S surround each main vibrator VBR_M, but is different from the embodiment of FIG. 20 in that the sub-vibrators VBR_S are placed at substantially the same separation distance from the main vibrator VBR_M. In the present embodiment, when one main vibrator VBR_M generates a main vibration wave, the sub-vibrators VBR_S surrounding it are driven to have an optimal phase difference according to the separation distance, but the sub-vibrators VBR_S surrounding one main vibrator VBR_M may have the same phase. However, the exemplary embodiments of the present disclosure are not limited thereto, and the sub-vibrators VBR_S at the same distance may have different phases for the purpose of controlling the direction in which the main vibration wave is transmitted.

As described above, when the phase of the vibration wave of each vibrator VBR is adjusted differently according to the separation distance to cause constructive/destructive interference, a haptic operation can be precisely performed. The display device may increase the user's immersion in the application by providing different haptic interfaces to the user according to the progress status of the application and the user's touch input in the application. Hereinafter, an exemplary haptic interface using the above-described vibrator VBR will be described.

Figure 24:
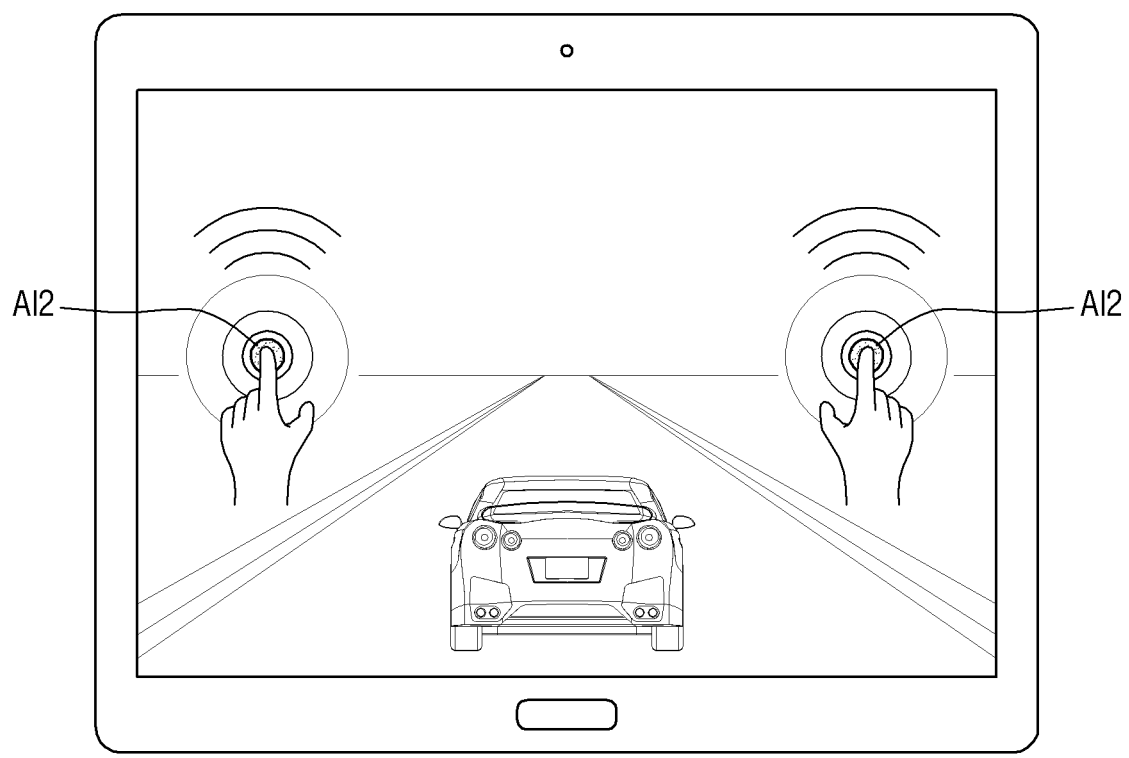
FIG. 24 is a diagram illustrating an application execution screen of a display device provided with the haptic interface of FIG. 23.

FIG. 23 is a table illustrating a haptic interface providing method of a display device according to an exemplary embodiment. FIG. 23 illustrates a method of providing a haptic interface according to a game situation and a user's touch input when a display device is executing an application for a car racing game. FIG. 24 is a diagram illustrating an application execution screen of a display device provided with the haptic interface of FIG. 23.

The display device includes a main vibrator and a sub-vibrator. One main vibrator may be provided, but a plurality of main vibrators may be provided. In one exemplary embodiment, the main vibrators may include a first main vibrator overlappingly disposed below or disposed around a first acceleration icon AI1 and a second main vibrator overlappingly disposed below or disposed around a second acceleration icon AI2. Hereinafter, there will be described a case where the first main vibrator and the second main vibrator simultaneously generate main vibration waves having the same amplitude and frequency. However, the first main vibrator and the second main vibrator may generate main vibration waves of different amplitudes or frequencies, or may generate vibration waves at different time points.

The plurality of sub-vibrators may be disposed around the first main vibrator and the second main vibrator. The first main vibrator, the second main vibrator and the sub-vibrators may have various relative arrangements as illustrated in FIGS. 17, 18, 19, 20, 21, and 22. In some embodiments, one main vibrator may be provided, in which case it may have the arrangement illustrated in FIG. 3.

Referring to FIG. 23, when counting a start of racing in a car racing game application, the display device may vibrate the main vibrator at a maximum amplitude of 52 and a frequency of 46 Hz for 298 ms. Here, a maximum amplitude of 52 is a relative value of the amplitude of the vibration waveform of the main vibrator or the sub-vibrators. In this case, the main vibrator may vibrate while the amplitude is increased four times and the amplitude is decreased four times during a period of 298 ms. The main vibrator may rise four times with the same amplitude at the same interval and descend four times with the same amplitude at the same interval. In the above step, while the main vibrator vibrates, the sub-vibrators may vibrate at the same frequency and in different phases according to the separation position to implement destructive interference.

In the car racing game application, when the car starts, the display device may vibrate the main vibrator at a maximum amplitude of 66 and a frequency of 62 Hz for 736 ms. In the above step, while the main vibrator vibrates, the sub-vibrators may vibrate at the same frequency and in different phases according to the separation position to implement destructive interference.

In the car racing game application, when the user touches the first acceleration icon AI1, the display device may vibrate the main vibrator at a maximum amplitude of 60 and a frequency of 203 Hz for 98 ms. In this case, the main vibrator may vibrate while increasing the amplitude three times for 98 ms. In this case, the main vibrator may rise three times with the same amplitude at the same interval. In FIG. 23, it is illustrated that the number of times the amplitude increases is three, but the exemplary embodiments of the present disclosure are not limited thereto. The number of increases in amplitude may be N times. In the above step, while the main vibrator vibrates, the sub-vibrators may vibrate at the same frequency and in different phases according to the separation position to implement destructive interference.

In the car racing game application, when the user touches the second acceleration icon AI2, the display device may vibrate the main vibrator at a maximum amplitude of 60 and a frequency of 203 Hz for 201 ms. When the user touches the second acceleration icon AI2, the vibration period of the main vibrator may be longer than when the first acceleration icon AI1 is touched. In FIG. 23, it is illustrated that when the user touches the first acceleration icon AI1, the frequency and maximum amplitude of the main vibrator are the same as the frequency and maximum amplitude of the main vibrator when the user touches the second acceleration icon AI2, but the exemplary embodiments of the present disclosure are not limited thereto. When the user touches the first acceleration icon AI1, the frequency and maximum amplitude of the main vibrator may be different from the frequency and the maximum amplitude of the main vibrator when the user touches the second acceleration icon AI2. Further, in this case, the main vibrator may vibrate while increasing the amplitude five times for 201 ms. In this case, the main vibrator may rise five times with the same amplitude at the same interval. In the above step, while the main vibrator vibrates, the sub-vibrators may vibrate at the same frequency and in different phases according to the separation position to implement destructive interference.

In the car racing game application, when the car collides with another car or object, the display device may vibrate the main vibrator at a maximum amplitude of 50 and a frequency of 148 Hz for 47 ms. In this case, the main vibrator may vibrate while the amplitude is increased once and the amplitude is decreased once during a period of 47 ms. The main vibrator may rise once with the same amplitude at the same interval and descend once with the same amplitude at the same interval. In FIG. 23, it is illustrated that the number of times the amplitude increases/decreases is one, but the exemplary embodiments of the present disclosure are not limited thereto. The number of times the amplitude increases may be N times, and the number of times the amplitude decreases may be M times. In the above step, while the main vibrator vibrates, the sub-vibrators may vibrate at the same frequency and in different phases according to the separation position to implement destructive interference.

In the car racing game application, when the car drifts, the display device may vibrate the main vibrator at a maximum amplitude of 52 and a frequency of 46 Hz for 725 ms. In this case, the main vibrator may vibrate while the amplitude is increased once and the amplitude is decreased once during a period of 725 ms. The main vibrator may rise once with the same amplitude at the same interval and descend once with the same amplitude at the same interval. In FIG. 23, it is illustrated that the number of times the amplitude increases/decreases is one, but the exemplary embodiments of the present disclosure are not limited thereto. The number of times the amplitude increases may be N times, and the number of times the amplitude decreases may be M times.

In the car racing game application, when the car stops, the display device may vibrate the main vibrator at a maximum amplitude of 59 and a frequency of 15 Hz for 2500 ms. In the above step, while the main vibrator vibrates, the sub-vibrators may vibrate at the same frequency and in different phases according to the separation position to implement destructive interference.

As described above, while the main vibrator vibrates, the sub-vibrators may vibrate at the same frequency and in different phases according to the separation position to implement destructive interference, thereby increasing the haptic sensitivity at the touch position.

In addition, according to the embodiment shown in FIGS. 23 and 24, when the user performs a first touch input of touching the first acceleration icon AI1, the display device may generate a first vibration using the main vibrator and/or the sub-vibrator to provide a first haptic interface. Further, when the user performs a second touch input of touching the second acceleration icon AI2, the display device may generate a second vibration different from the first vibration by using the main vibrator and/or the sub-vibrator to provide a second haptic interface different from the first haptic interface. For example, as shown in FIG. 23, the period of the second vibration may be longer than the period of the first vibration. In this case, when the user performs the second touch input of touching the second acceleration icon AI2, the vibration may be sensed for a longer time than when the first touch input of touching the first acceleration icon AI1 is performed. In addition, the user may feel that the effect of the car acceleration executed by the touch of the second acceleration icon AI2 is higher than the effect of the car acceleration executed by the touch of the first acceleration icon AI1 in the car racing game application.

Meanwhile, it is illustrated in FIG. 23 that only the period of the first vibration and the period of the second vibration are different, and the frequency and amplitude of the first vibration are the same as the frequency and amplitude of the second vibration, but the exemplary embodiments of the present disclosure are not limited thereto. For example, the frequency, amplitude and period of the first vibration may be different from the frequency, amplitude and period of the second vibration, respectively. Alternatively, the frequency and amplitude of the first vibration may be different from the frequency and amplitude of the second vibration, respectively. Alternatively, the frequency and period of the first vibration may be different from the frequency and period of the second vibration, respectively. Alternatively, the amplitude and period of the first vibration may be different from the amplitude and period of the second vibration, respectively. Alternatively, the frequency of the first vibration may be different from the frequency of the second vibration. Alternatively, the amplitude of the first vibration may be different from the amplitude of the second vibration.

As described above, the user may feel that the first vibration and the second vibration are different due to a change in at least one of the frequency, amplitude and period of the vibration. In addition, it can be sensed that a precise haptic operation is implemented through destructive interference of the sub-vibrators.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
a display panel;
a main vibrator disposed on the display panel and configured to generate a main vibration wave; and
a plurality of sub-vibrators disposed on the display panel and spaced apart from the main vibrator, the plurality of sub-vibrators configured to generate sub-vibration waves, respectively,
wherein the plurality of sub-vibrators comprises:
a first sub-vibrator disposed at a first distance from the main vibrator in a plan view, the first sub-vibrator being configured to generate a first sub-vibration wave; and
a second sub-vibrator disposed at a second distance from the main vibrator in the plan view, the second sub-vibrator being configured to generate a second sub-vibration wave having a phase different from a phase of the first sub-vibration wave, and
wherein the second distance is different from the first distance, and
wherein a difference ($\Delta\theta_1$) between the phase of the first sub-vibration wave and the phase of the main vibration wave satisfies the following equation 1:

$$\Delta\theta_1 = 180° * n - (360° * d1)/\lambda$$

where n is an integer, d1 is the first distance between the main vibrator and the first sub-vibrator, and $\lambda$ is a wavelength of the main vibration wave and the first sub-vibration wave.

2. The display device of claim 1, wherein a phase of the main vibration wave is different from the phase of the first sub-vibration wave and the phase of the second sub-vibration wave.

3. The display device of claim 2, wherein the main vibration wave, the first sub-vibration wave and the second sub-vibration wave have a same wavelength.

4. The display device of claim 3, wherein
a difference ($\Delta\theta_1$) between the phase of the second sub-vibration wave and the phase of the main vibration wave satisfies the following equation 2:

$$\Delta\theta_1 = 180° * n - (360° * d2)/\lambda,$$

where d2 is the second distance between the main vibrator and the second sub-vibrator, and $\lambda$ is the wavelength of the main vibration wave, the first sub-vibration wave, and the second sub-vibration wave.

5. The display device of claim 4, wherein each of the first distance and the second distance is smaller than half of the wavelength.

6. The display device of claim 5, wherein the difference between the phase of the first sub-vibration wave and the phase of the main vibration wave is greater than 0° and less than 180°, and
wherein a difference between the phase of the second sub-vibration wave and the phase of the main vibration wave is greater than 0° and less than 180°.

7. The display device of claim 2, wherein the first sub-vibration wave and the second sub-vibration wave are configured to destructively interfere with the main vibration wave.

8. The display device of claim 2, further comprising a phase controller configured to control a phase of an AC voltage provided to the main vibrator and each of the first and second sub-vibrators.

9. The display device of claim 1, wherein a maximum amplitude of the main vibrator is greater than a maximum amplitude of the first sub-vibrator or the second sub-vibrator.

10. The display device of claim 1, wherein the plurality of sub-vibrators at least partially surround the main vibrator.

11. The display device of claim 10, wherein the main vibrator is disposed in a central region of the display panel in the plan view, and
the plurality of sub-vibrators are disposed along edges of the display panel in the plan view.

12. The display device of claim 1, further comprising: a cover panel overlapping the display panel,
wherein the display panel includes a display surface and an opposite surface facing opposite to the display surface,
wherein the cover panel is disposed on the opposite surface of the display panel, and the main vibrator and the sub-vibrators are attached on the cover panel.

13. The display device of claim 12, further comprising a touch member disposed on the display surface of the display panel.

14. The display device of claim 1, wherein each of the main vibrator and the sub-vibrators comprises at least one of a piezoelectric element and an exciter.

15. The display device of claim 1, wherein the main vibrator comprises a first main vibrator and a second main vibrator spaced apart from each other in the plan view.

16. The display device of claim 15, wherein the plurality of sub-vibrators surround the first main vibrator and the second main vibrator in the plan view.

17. The display device of claim 16, wherein the sub-vibrators are not disposed between the first main vibrator and the second main vibrator in the plan view.

18. The display device of claim 15, wherein the first main vibrator is configured to generate a first main vibration wave during a first driving mode, and
wherein the second main vibrator is configured to generate a vibration wave to cancel out the first main vibration wave during the first driving mode.

19. The display device of claim 18, wherein the first main vibrator is configured to generate the first main vibration wave during in a second driving mode, and
the second main vibrator is configured to generate a second main vibration wave which constructively interferes with the first main vibration wave during in the second driving mode.

20. A display device comprising:
a display panel;
a first vibrator disposed on the display panel; and
a second vibrator disposed on the display panel and spaced apart from the first vibrator,
wherein a difference ($\Delta\theta$) between a phase of a vibration wave of the second vibrator and a phase of a vibration wave of the first vibrator satisfies the following equation:

$$\Delta\theta_1 = 180°*n - (360°*d)/\lambda,$$

where n is an integer, d is a distance between the first vibrator and the second vibrator, and $\lambda$ is a wavelength of the vibration wave of the first vibrator and the vibration wave of the second vibrator.

* * * * *